(12) United States Patent
Khalifa

(10) Patent No.: US 10,034,569 B2
(45) Date of Patent: Jul. 31, 2018

(54) BEVERAGE FILTERING SYSTEM

(75) Inventor: Aly Khalifa, Raleigh, NC (US)

(73) Assignee: O2C RALEIGH, LLC, Chicago, IL (US)

( * ) Notice: Subject to any disclaimer, the term of this patent is extended or adjusted under 35 U.S.C. 154(b) by 1888 days.

(21) Appl. No.: 12/660,851

(22) Filed: Mar. 4, 2010

(65) Prior Publication Data
US 2010/0224078 A1    Sep. 9, 2010

Related U.S. Application Data

(60) Provisional application No. 61/157,373, filed on Mar. 4, 2009.

(51) Int. Cl.
*A47J 31/06* (2006.01)
*A47J 31/20* (2006.01)

(52) U.S. Cl.
CPC ................................ *A47J 31/20* (2013.01)

(58) Field of Classification Search
USPC ........................................................... 99/323
See application file for complete search history.

(56) References Cited

U.S. PATENT DOCUMENTS

| | | | |
|---|---|---|---|
| 607,409 A * | 7/1898 | Falardeau | 99/284 |
| 5,108,768 A * | 4/1992 | So | 426/77 |
| 5,738,786 A * | 4/1998 | Winnington-Ingram | 210/474 |
| 5,952,028 A * | 9/1999 | Lesser | 426/433 |
| 6,095,033 A * | 8/2000 | Melton | 99/323.3 |
| 6,161,470 A * | 12/2000 | Justus | 99/319 |
| 6,692,780 B1 * | 2/2004 | Sandin | 426/77 |
| 2007/0137494 A1 * | 6/2007 | Wilhite | 99/279 |
| 2009/0238725 A1 * | 9/2009 | Ellis et al. | 422/101 |

* cited by examiner

*Primary Examiner* — Melba Bumgarner
*Assistant Examiner* — Amir Klayman
(74) *Attorney, Agent, or Firm* — Thompson Coburn LLP; Alan H. Norman

(57) ABSTRACT

A beverage filtering device wherein flavoring solids, such as coffee, tea, or herbs, are infused or brewed with fluids and then a finished beverage is filtered from the flavoring solids using a system of nested cups. The nested cups are pressed together during filtration to create a compact form that can serve as a beverage cup or beverage serving device.

22 Claims, 36 Drawing Sheets

BEVERAGE FILTERING SYSTEM

CROSS REFERENCE TO RELATED APPLICATION

This application claims the benefit of U.S. Provisional Application Ser. No. 61/157,373, filed Mar. 4, 2009.

BACKGROUND OF THE INVENTION

1. Field of Invention

The present invention is related to the preparation of beverages, such as coffees and teas, by brewing or infusing. More specifically, the present invention relates to brewing and infusing devices which include a filter for removing solid material from which the beverage is prepared from the beverage so obtained.

2. Description of the Related Art

Coffee and other flavored beverages have been enjoyed by people since the ninth century A.D., and many brewing and infusing methods have been tried over the years. Infusions and brews are primarily achieved by adding hot water to flavoring solids, such as tea leaves, herbs or coffee beans. The beverage achieves a desired state by allowing a sufficient time for the optimum flavors to be extracted from the solids into the water, and then ceasing the process by removing the water from the solids. Unregulated exposure to the flavoring solids may over-extract the solids, releasing strong or unpleasant tastes like bitterness in coffee.

In most current brewing methods, ceasing the infusion process requires the removal of a filtering device from the beverage. This is often inconvenient and messy for the user. Additionally, most infusing methods require a preparation device to be separate from the drinking device. Further, most of the products on the market do not allow proper insulation of the beverage once it has been prepared.

Coffee is extracted by grinding beans into smaller pieces, and brewing. For a given amount of coffee, the surface area of a finer grind is exponentially greater than that of a coarser grind. As a result, finer grinds can brew much more quickly. However, the coffee preparation device must have a filter that can keep the smaller particles of finer grinds from passing into the beverage.

Lipids are small oils found in coffee that give it a buttery texture, and this is a desired attribute in gourmet coffees. Lipid molecules are generally found to be around 0.4 mm in diameter. There is a need for an invention that allows beverages to be infused into a convenient device that both prepares a beverage infusion and also serves as a drinking cup. Ideally, such an invention would be composed of at least two cups, namely, an inner cup and an outer cup, in which the inner cup would have a filter which would allow the passing of lipids, but not of the flavoring solids or grounds, into the beverage being prepared. This need is satisfied by the present invention.

SUMMARY OF THE INVENTION

Accordingly, the present invention is generally directed to a device for filtering beverages. It is more specifically intended for separating particulate matter used to make a beverage from the drinkable portion of the beverage. It is most specifically related to a system for allowing coffee to be brewed in one container of the device and then forcing the brewed coffee through a filter and into a preferably nested secondary container of the same device. The same system will also work for teas, infusions, and cocktails or other beverages in which the user wants to filter particulate from a beverage after a brewing or steeping period.

The extent of infusion of the fluids will depend on time, size, temperature and agitation of the solution. The system is optimized for various beverages by seeking the best balance of these variables for each beverage.

The small holes of a filter create friction on fluid moving through it. This results in back pressure of the filter. Filtration is achieved by overcoming the back pressure when exerting force on the inner cup and pressing it into the outer cup(s). When completely inserted, the back pressure prevents further unwanted filtration.

Accordingly, an object of the present invention is to provide a compact device for filtering beverages.

Another object of the invention is to provide a system for allowing coffee to be brewed in one container of the device, and subsequently running the brewed coffee through a filter and into a secondary container of the same device.

A further object of the invention is to create a beverage infusing device that can be used for teas, infusions, and cocktails or other beverages from which a user wants to filter particulate matter after a brewing or steeping period before drinking.

Yet another object of the present invention is to provide an infuser that can be used to optimize various beverages by seeking the best balance of these variables for each beverage.

Still another object of the present invention is to provide a filtering system with small holes to create friction on fluid moving through it. This results in back pressure of the filter. Filtration is achieved by overcoming the back pressure when exerting force on an inner cup and pressing it into an outer cup. When the inner cup is completely inserted, the back pressure prevents further unwanted filtration.

Still other objects and advantages of the invention will, in part, be obvious and apparent from the specification.

Accordingly, the present invention is a beverage filtering system for preparing a beverage by steeping solid material in a liquid to extract flavoring therefrom and to filter the solid material from the liquid for drinking. The system includes an outer cup for steeping solid material in a liquid, and an inner cup, nestable within the outer cup and slidably movable therewithin from an unfiltered position, where the bottom of the inner cup is above the surface of any liquid in the outer cup, to a filtered position, where the inner cup is within the outer cup as far as it may be pushed. The inner cup has an upper portion and a lower portion and includes a filter in the lower portion. Together, the outer cup and the inner cup form a beverage cup or server when said inner cup is in said filtered position for consumption of the beverage. With the beverage filtering system, when the beverage has been prepared within the outer cup, the inner cup may be moved to the filtered position relative to the outer cup from the unfiltered position to filter solid material from the liquid for serving the beverage.

The present invention is also a beverage filtering system for preparing a beverage by steeping solid material in a liquid to extract flavoring therefrom and to filter said solid material from said liquid for drinking, wherein the system includes a stand and a brewing vessel mounted on the stand. The brewing vessel has a bottom portion including a filter. This beverage filtering system also includes a plunger, which is movable within the brewing vessel and forms a seal therewith. The systems also includes a means for moving the plunger within the brewing vessel to force a brewed liquid through the filter and into a receptacle below the filter.

The means for moving the plunger may include an arm operatively attached to the plunger and extending therefrom upward out of the brewing vessel, and a handle rotatably mounted to the stand above the brewing vessel. The handle is operatively attached to the arm, so that the handle may be used to move the plunger within the brewing vessel for the purpose given above.

The invention accordingly comprises the features of construction, combinations of elements, and arrangements of parts and processes, which will be exemplified in the constructions and processes as hereinafter set forth, and the scope of the invention will be indicated in the claims.

The present invention will be described in more complete detail with frequent reference being made to the figures identified below.

DETAILED DESCRIPTION OF THE PREFERRED EMBODIMENTS

Figure 1:
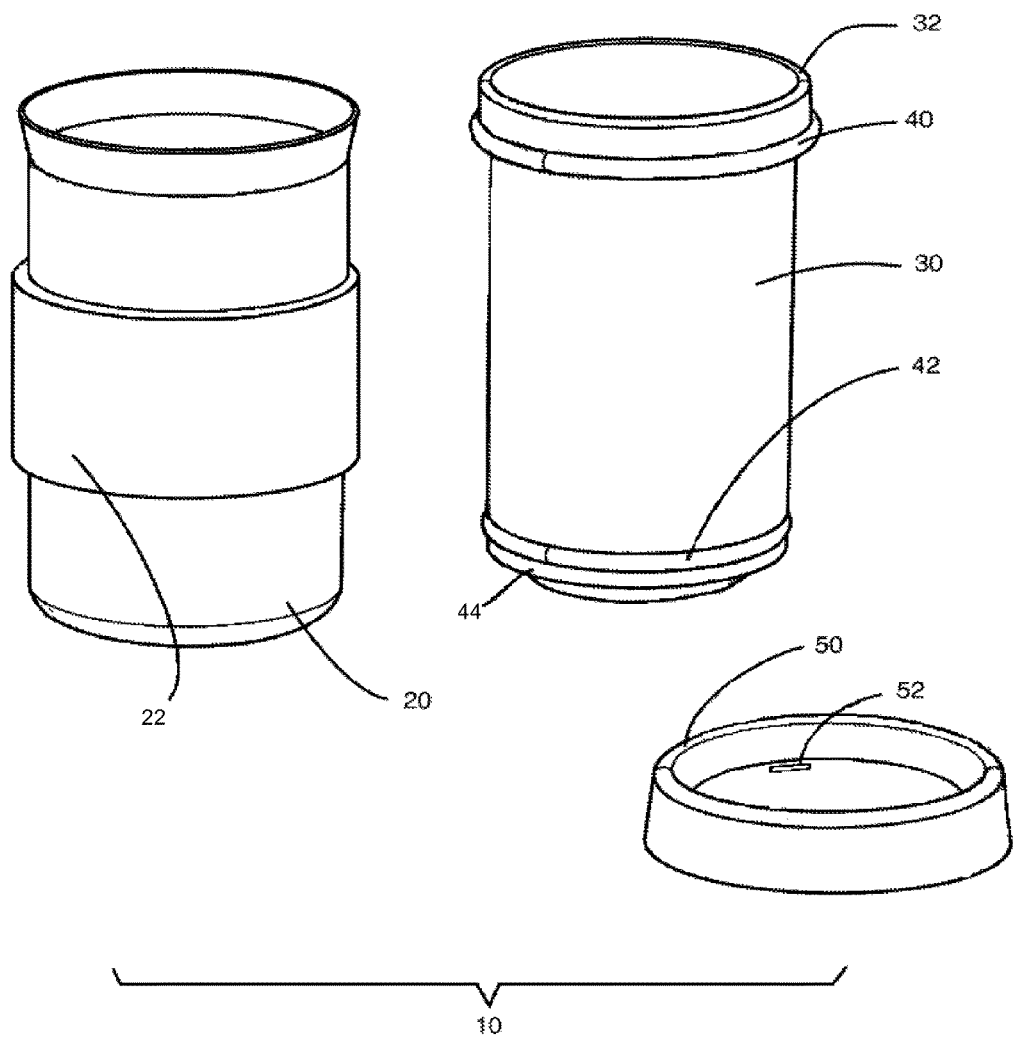
FIG. 1 is a perspective view of the components of a first embodiment of the beverage filtering system of the present invention.

Turning now to these figures, FIG. 1 is a perspective view of the components of a first embodiment of the beverage filtering system of the present invention. The system 10 includes an outer cup 20, preferably made of a rigid material, such as glass, steel or plastic. The outer cup 20, in addition, preferably has a cylindrical form for reasons which will become clear in the discussion to follow. However, other shapes with vertical walls could be utilized. In this first embodiment, the outer cup 20 is of integral, or one-piece, construction.

The outer cup 20 may also have an outer sleeve 22, made of a polymeric foam, textile material, wood, or other insulating material, provided not only to protect the hand of the person using the system 10, but also to retard the cooling of its contents. The sleeve 22 may be solid or perforated, and may alternatively be of a metal or other polymer material. The outer cup 20 may alternatively be a double-walled vessel, as will be shown below, with or without a vacuum being provided between its inner and outer surfaces, thereby creating an insulated outer cup 20.

The inner cup 30 of the system 10 is also preferably made of a rigid material, such as glass, steel, or plastic, and preferably has a cylindrical form of a slightly smaller diameter than that of the outer cup 20, so that the inner cup 30 may fit within the outer cup 20.

Figure 2:
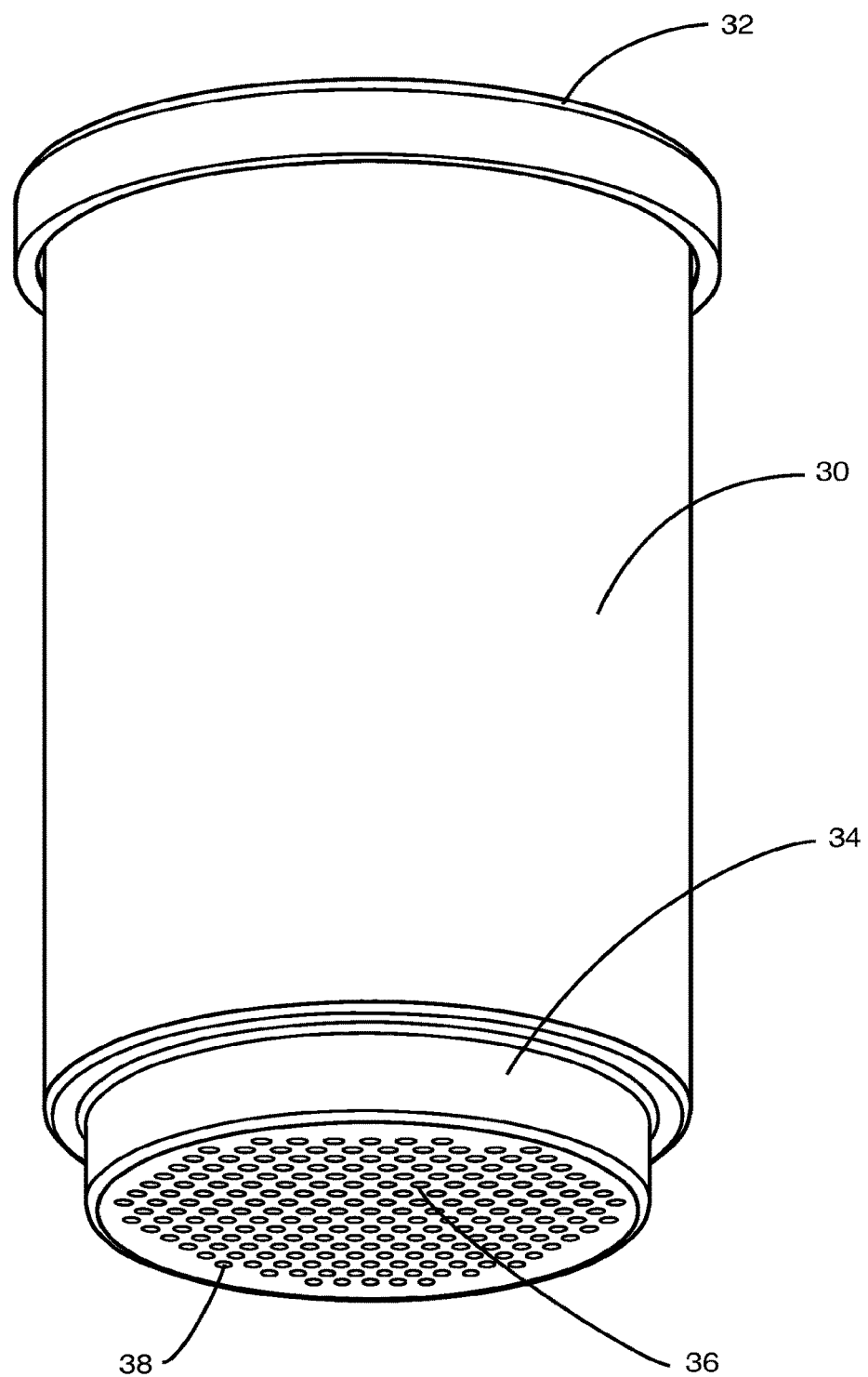
FIG. 2 is a perspective view of the inner cup of the system.

FIG. 2 is a perspective view of inner cup 30 taken from a somewhat different direction. Inner cup 30 has a rolled rim 32 to provide for the comfort of one drinking from it. Below is a portion 34 of reduced diameter, and, on the very bottom of inner cup 30, is a filter 36 formed by perforations 38 in the bottom of the inner cup 30. Perforations 38 are of a diameter to enable desired flavoring oils, such as lipids from brewed coffee, to pass through filter 36 without permitting large particulates of bulky flavoring solids, such as particles of ground coffee, to do so. Perforations 38 preferably have a diameter in the range from 0.2 to 0.6 mm. More preferably, perforations 38 have a diameter of approximately 0.4 mm. Perforations 38 may be provided in the hexagonally ordered array shown in FIG. 2. In such an array, where the center-to-center distance separating each perforation 38 from its closest neighbors is 1.5 mm, there would be about 300 perforations 38 per square inch.

Figure 3:
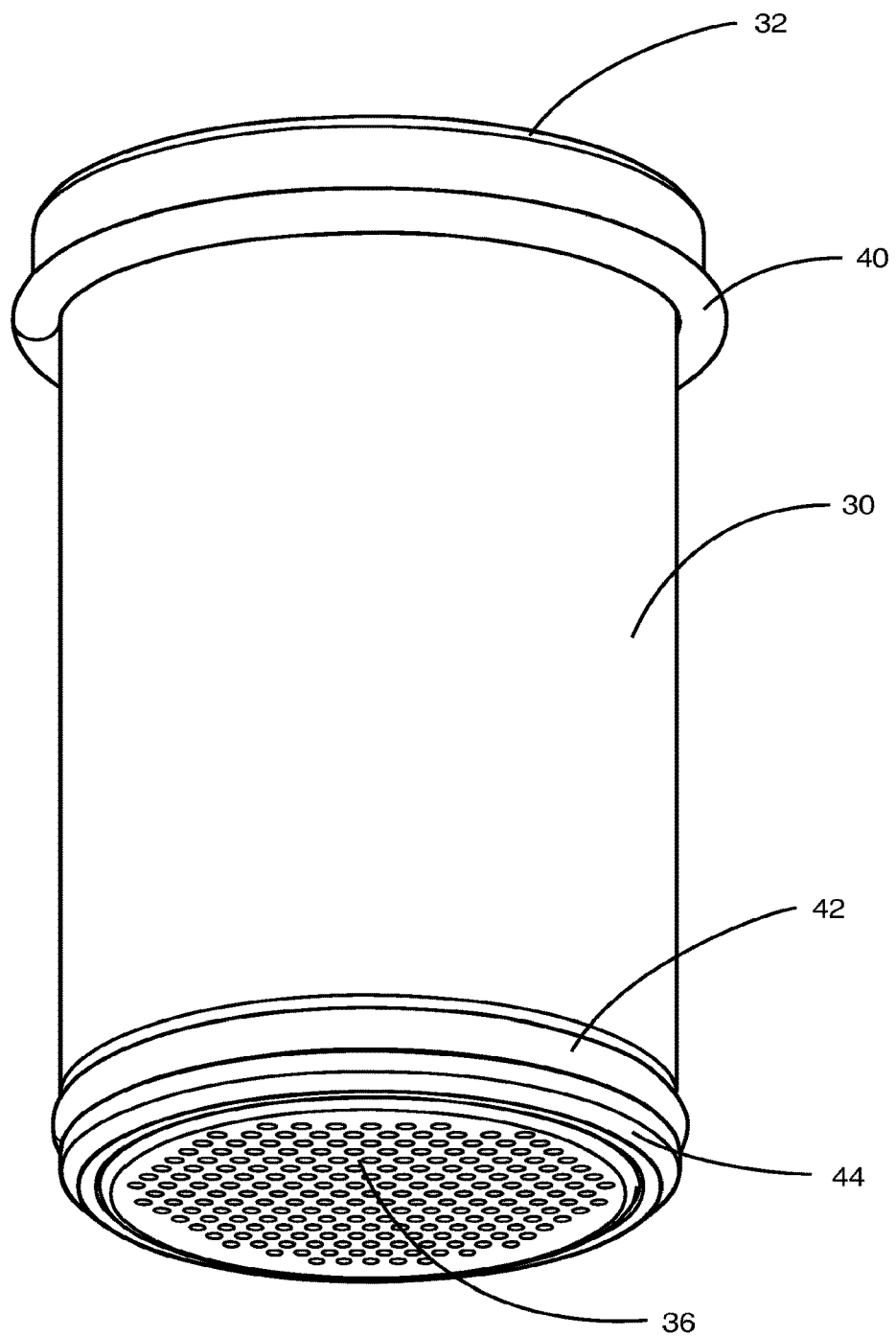
FIG. 3 is another perspective view of the inner cup showing additional elements.

FIG. 3 is a perspective view of inner cup 30 from the same viewpoint as FIG. 2 and showing several additional elements. At the top of the inner cup 30, beneath and abutting against the rolled rim 32, is an O-ring 40, whose purpose will be described below. At the bottom of the inner cup 30, disposed on the portion 34 of reduced diameter, is another O-ring 42. O-rings 40, 42 are preferably made of an elastomeric material, such as silicone rubber. O-ring 42 is maintained on portion 34 of reduced diameter by retaining ring 44, which may be of stainless steel.

O-rings 40, 42, as well as other O-rings to be identified below, may be circular in cross section. Alternatively, they may be made with a thin rectangular or triangular projection extending radially from the circular cross section, forming "wipers" on the O-rings, thereby allowing for a wider range of tolerances between the inner and outer cups. Alternatively, more than one O-ring may be used in a given location, for instance, two or more O-rings, each with or without "wiper" features. O-rings having cross-sectional shapes other than circular, such as triangular or rectangular, may also be used, each with or without "wipers".

Returning now to FIG. 1, the beverage filtering system 10 also includes a lid 50. The lid 50 may include a pair of diametrically opposed openings 52, one of which being visible in FIG. 1. Lid 50 may also be made of a rigid material, such as glass, steel or plastic. The openings 52 may function as sipping and vent holes where the system 10 is used as a cup.

Figure 4:
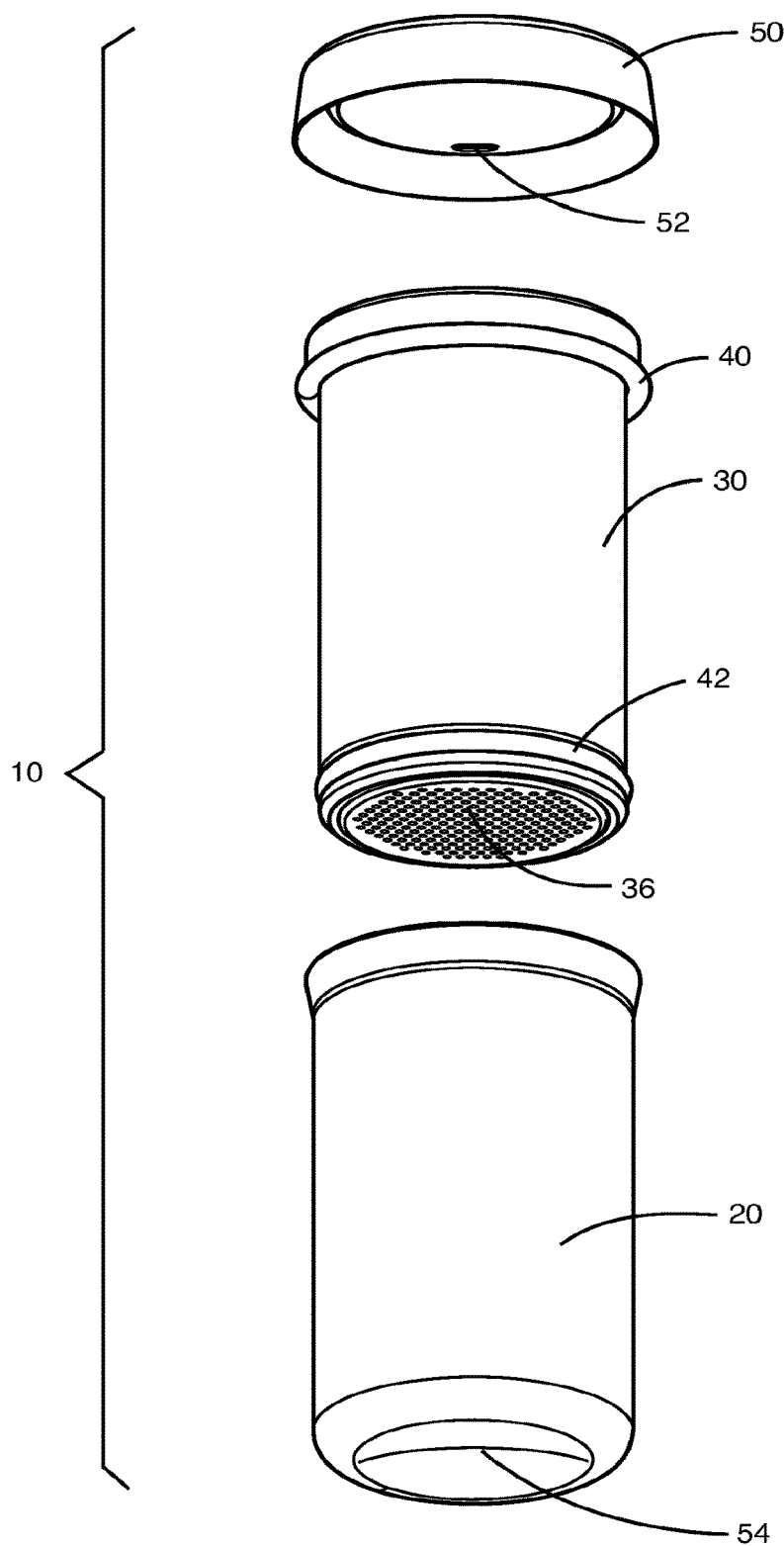
FIG. 4 is an exploded view of the first embodiment of the beverage filtering system.

FIG. 4 is an exploded view of the beverage filtering system 10 and shows the relationship between the inner cup 30, the outer cup 20, and the lid 50.

Figure 5A:
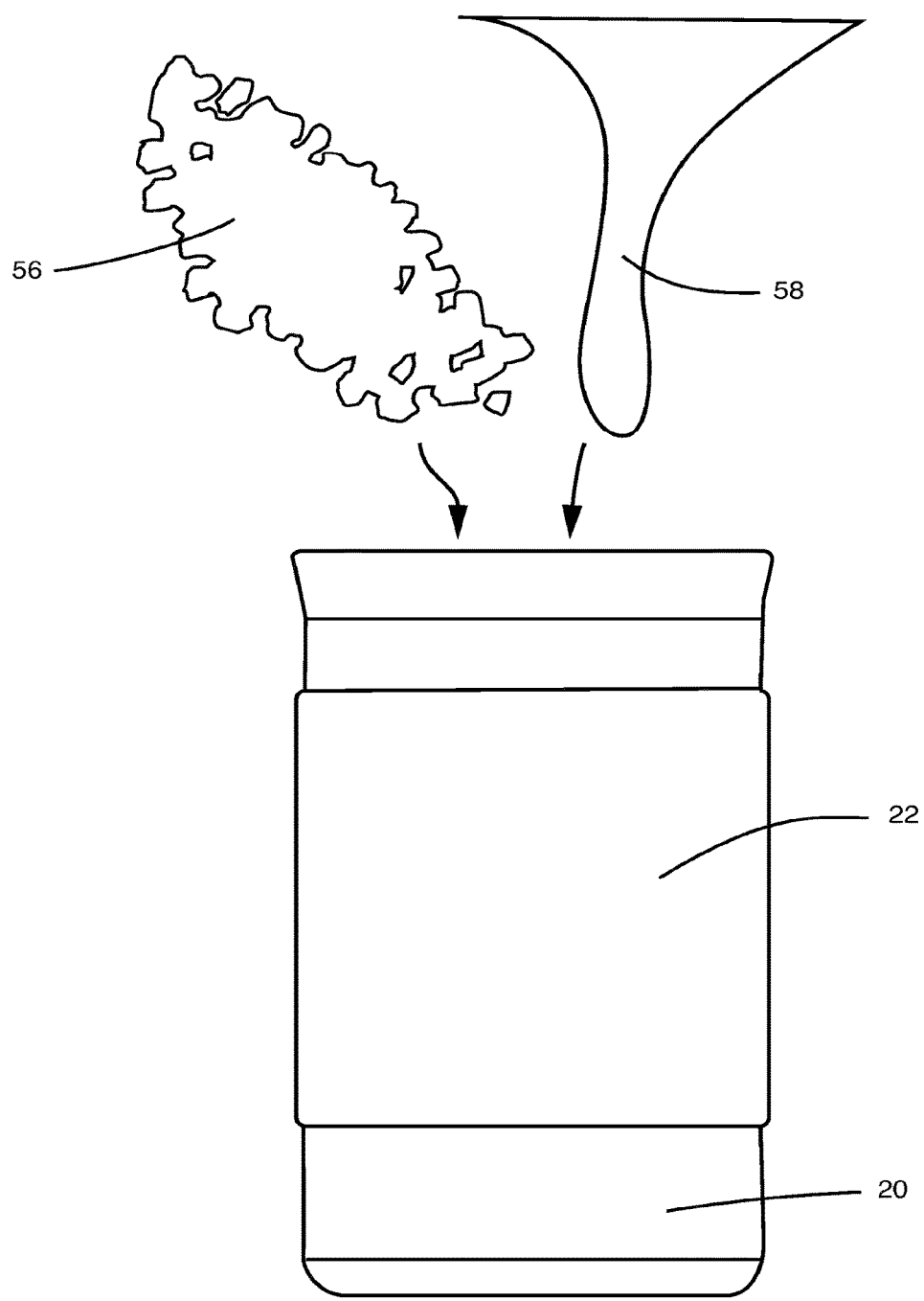
FIGS. 5A through 5D illustrate the manner in which the beverage filtering system may be used.

FIGS. 5A through 5D illustrate the manner in which the beverage filtering system 10 may be used. Referring first to FIG. 5A, a suitable amount of material, such as ground coffee 56, from which a beverage is to be prepared, is added to the outer cup 20 along with an appropriate amount of a liquid, such as hot water 58.

Figure 5B:
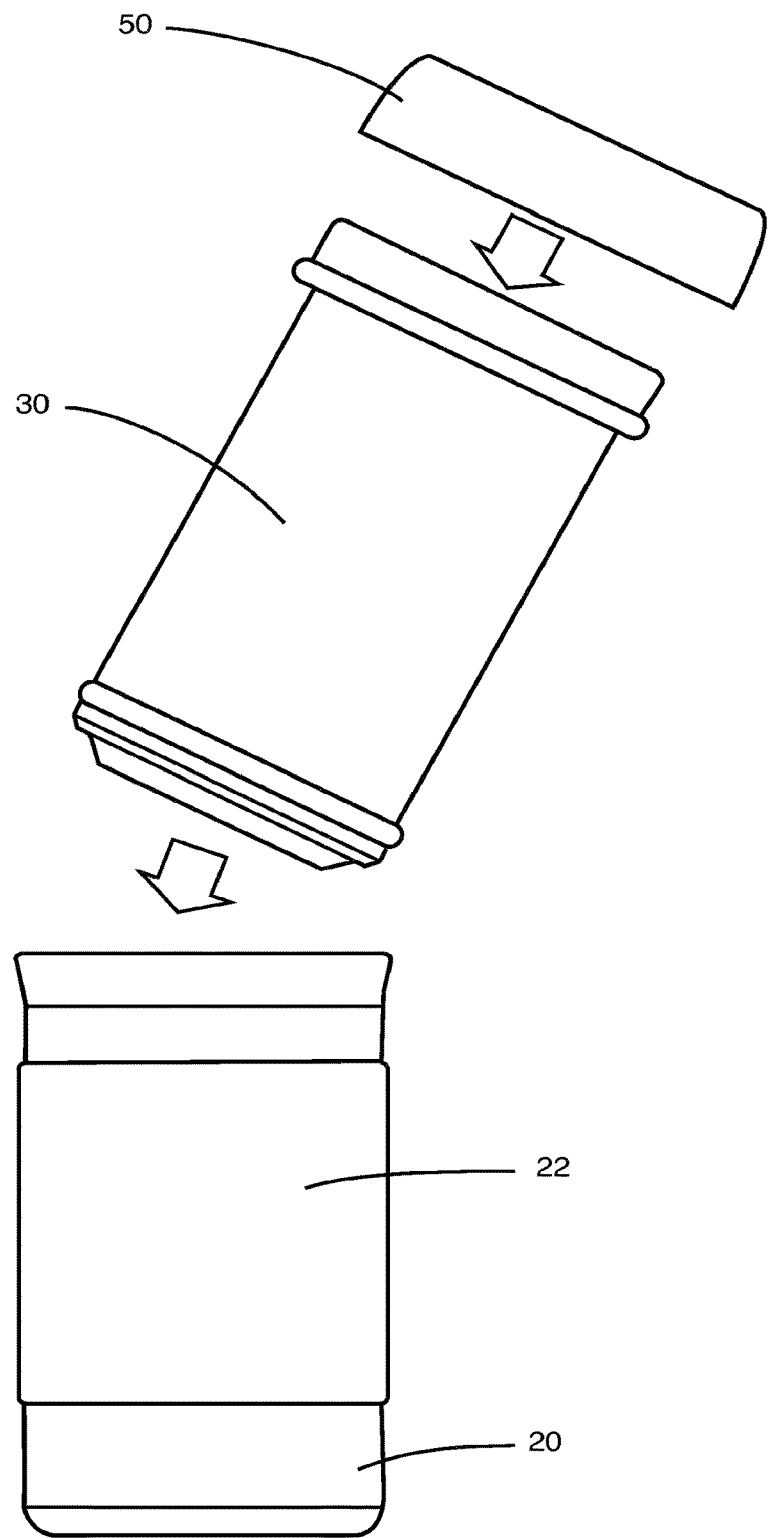
Figure 5C:
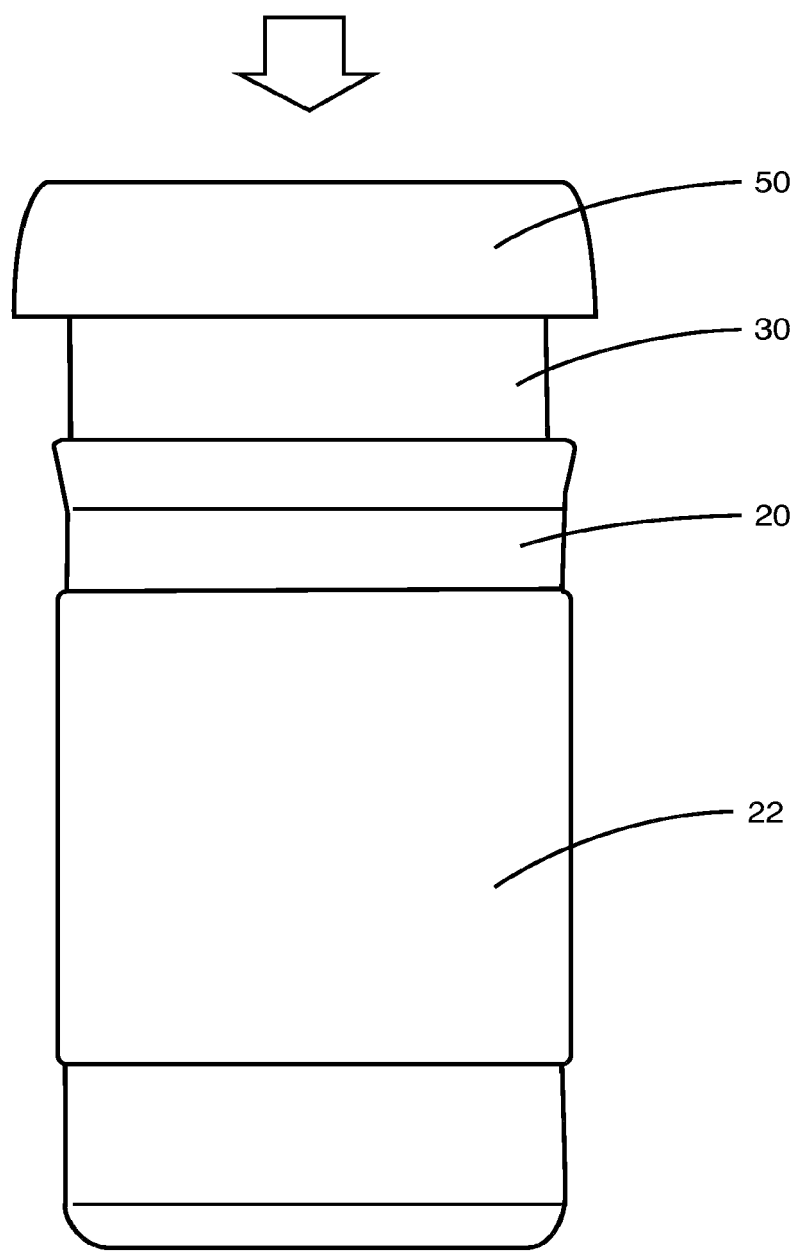
Figure 5D:
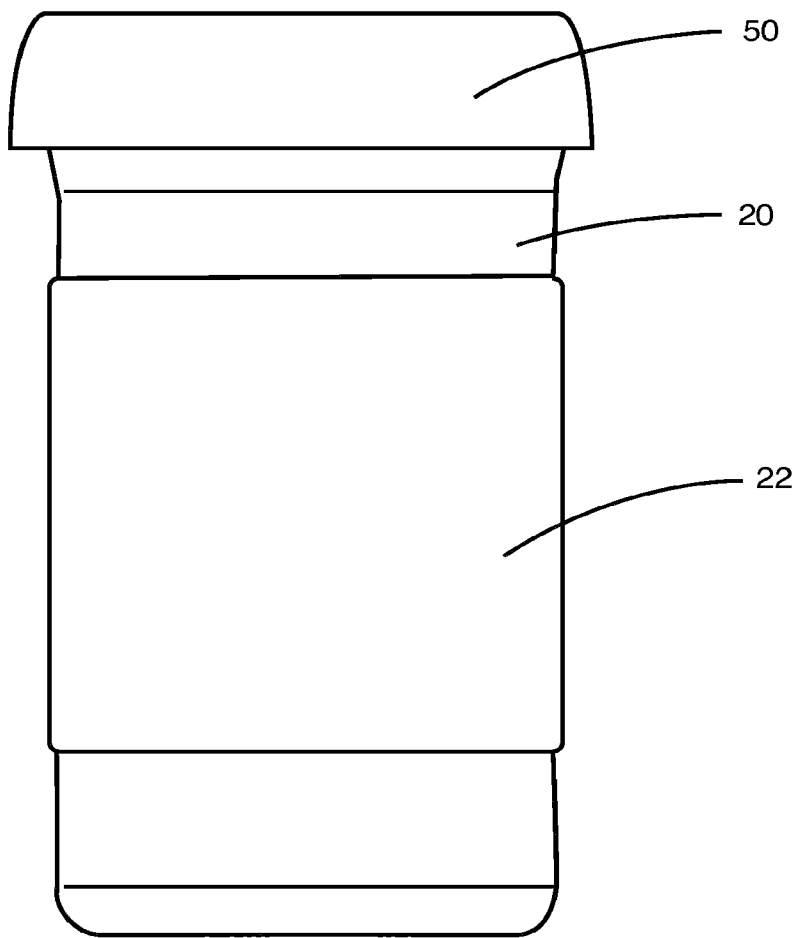

The ground coffee 56 is allowed to brew in the hot water 58 for a desired time to prepare coffee of a strength suited to the tastes of the user. During this time, the outer cup 20 may be agitated by the user to create a swirling motion within the hot water 58 to assist with the brewing process. After the desired time has elapsed, the inner cup 30 with lid 50 on top is inserted into the outer cup 20, as shown in FIG. 5B, and gradually pushed down as far as possible, as shown in FIGS. 5C and 5D. Brewed coffee, having passed through filter 36 at the bottom of the inner cup 30 as the inner cup 30 was being pushed into the outer cup 20, may then be drunk or poured from the system 10.

Figure 6:
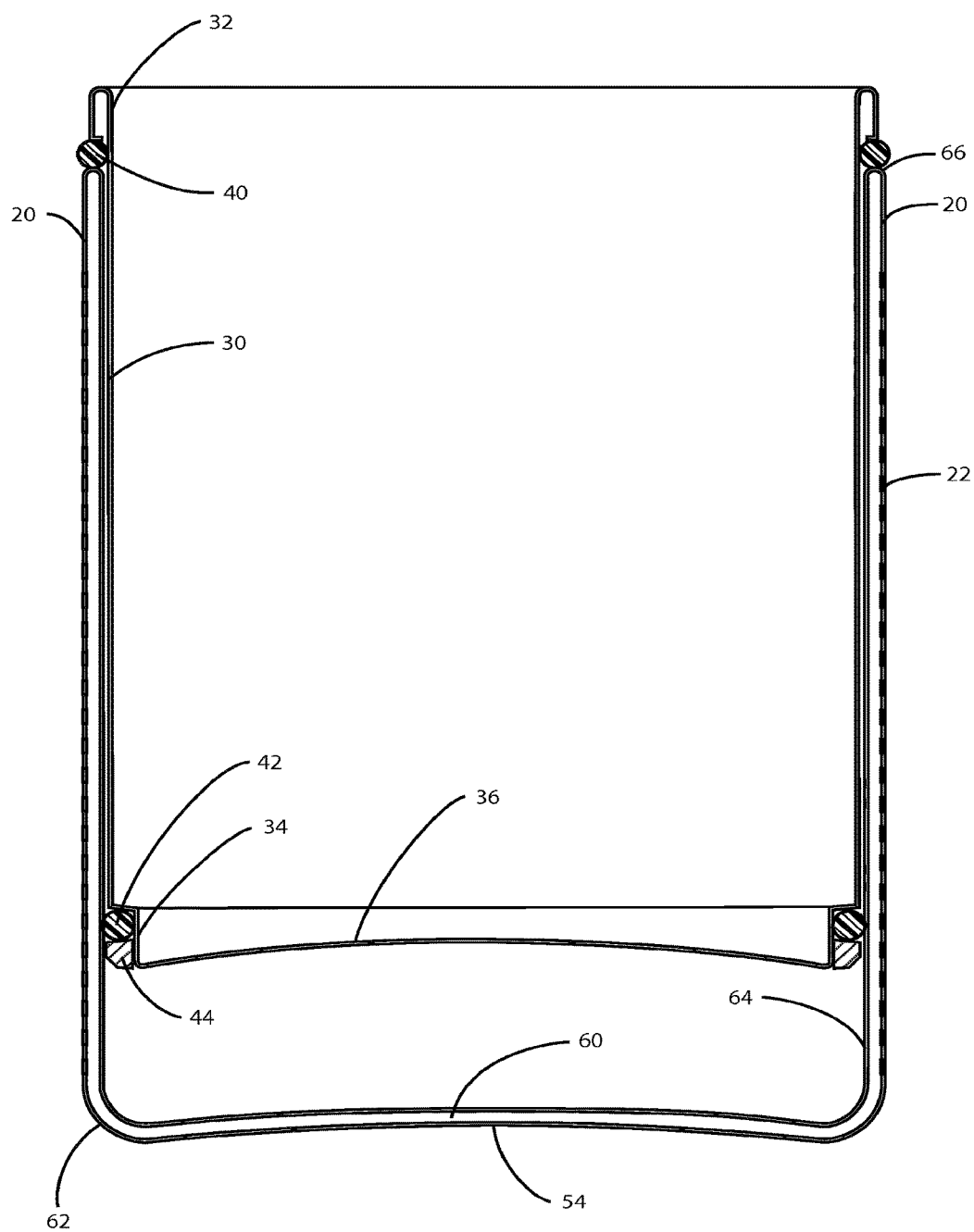
FIG. 6 is a cross-sectional view of the inner and outer cups of the beverage filtering system.

FIG. 6 is a cross-sectional view of the inner cup 30 and the outer cup 20 when the former has been fully inserted into the latter. As shown in FIG. 6, outer cup 20 may be double-walled and include an insulating layer 60, preferably filled with air or another insulating material, within the double wall 62. It may be alternatively evacuated by a vacuum, so as to prevent any expansion between the insulating surfaces. As noted above, outer cup 20 and inner cup 30 are preferably cylindrical in form with the inner cup 30 having a slightly smaller diameter than that of the outer cup 20, so that it may be fit inside outer cup 20 as shown. O-ring 42, which is disposed about portion 34 of reduced diameter and which has a somewhat larger outer diameter than that of the inner cup 30 and the inside surface 64 of the outer cup 20 forms a seal between the inner cup 30 and the outer cup 20 when the former is inserted into the latter. As a consequence, liquid in the outer cup 20 is forced through filter 36 at the bottom of the inner cup 30 as the inner cup 30 is gradually pushed into the outer cup 20.

The inner cup 30 is able to travel down into the outer cup 20 until O-ring 40, or other stopper of various materials or shapes, disposed below the rolled rim 32, reaches the rim 66 of the outer cup 20, thereby preventing further insertion. The volume between the filter 36 and the bottom of the outer cup 20 confines the materials from which a beverage is being prepared.

Figure 7A:
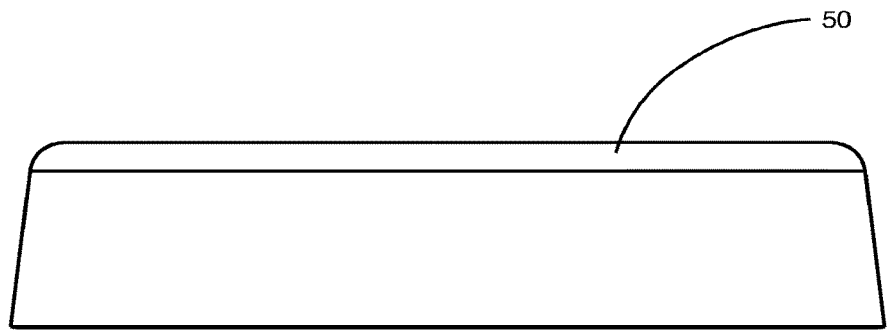
FIG. 7A is an elevational view of a lid therefor.
Figure 7B:
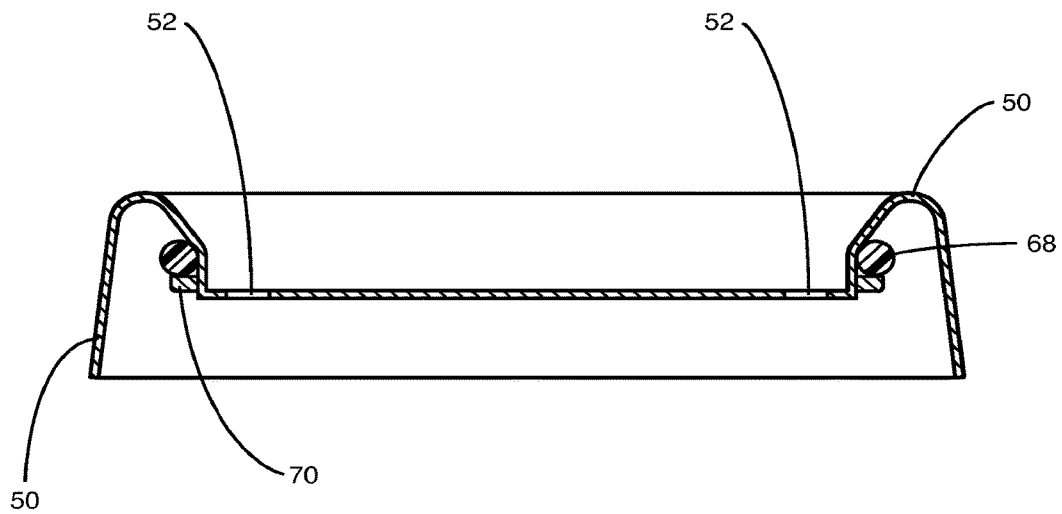
FIG. 7B is a cross-sectional view thereof.

FIG. 7A is an elevational view of lid 50 and FIG. 7B is a cross-sectional view thereof. As may be seen in FIG. 7B, openings 52 are diametrically opposed so that one may function as a sipping hole, while the other may function as a vent hole, when the system 10 is used as a cup. In such a situation, it may be necessary for the lid 50 to be sealed to the inner cup 30 to prevent the contents of the inner cup 30 from leaking out under the lid 50 when the system 10 is tipped for drinking. To this end, the inside of the lid 50 may be provided with an O-ring 68, which would be maintained in position by retaining ring 70, as shown in FIG. 7B, or by a molded-in increase in diameter to retain the O-ring in place. When the lid 50 so equipped is placed on top of the inner cup 30, O-ring 68 creates a seal between the inside of rolled rim 32 and lid 50.

Figure 8A:
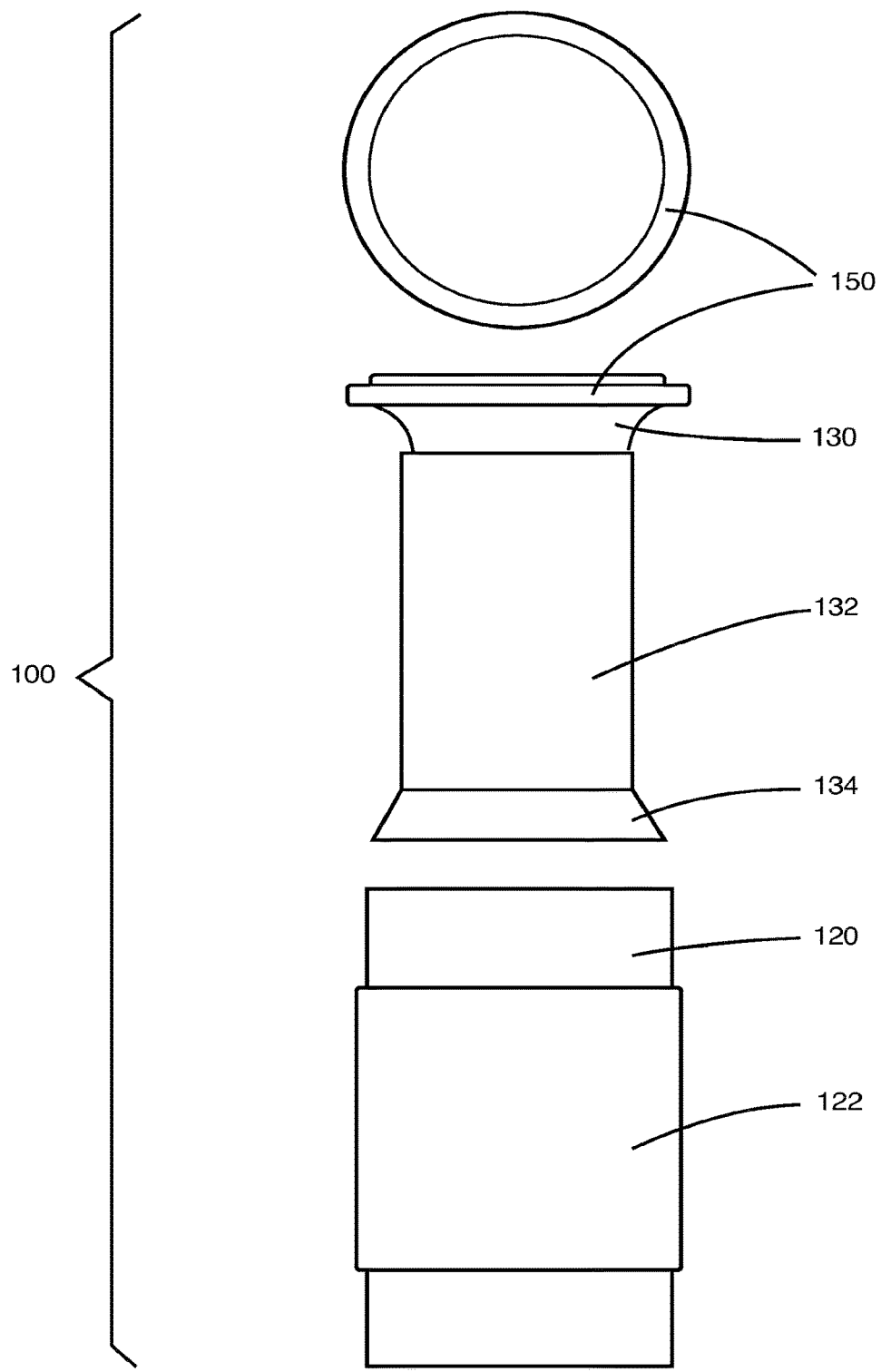
FIGS. 8A through 8D illustrate a second embodiment of the beverage filtering system.
Figure 8B:
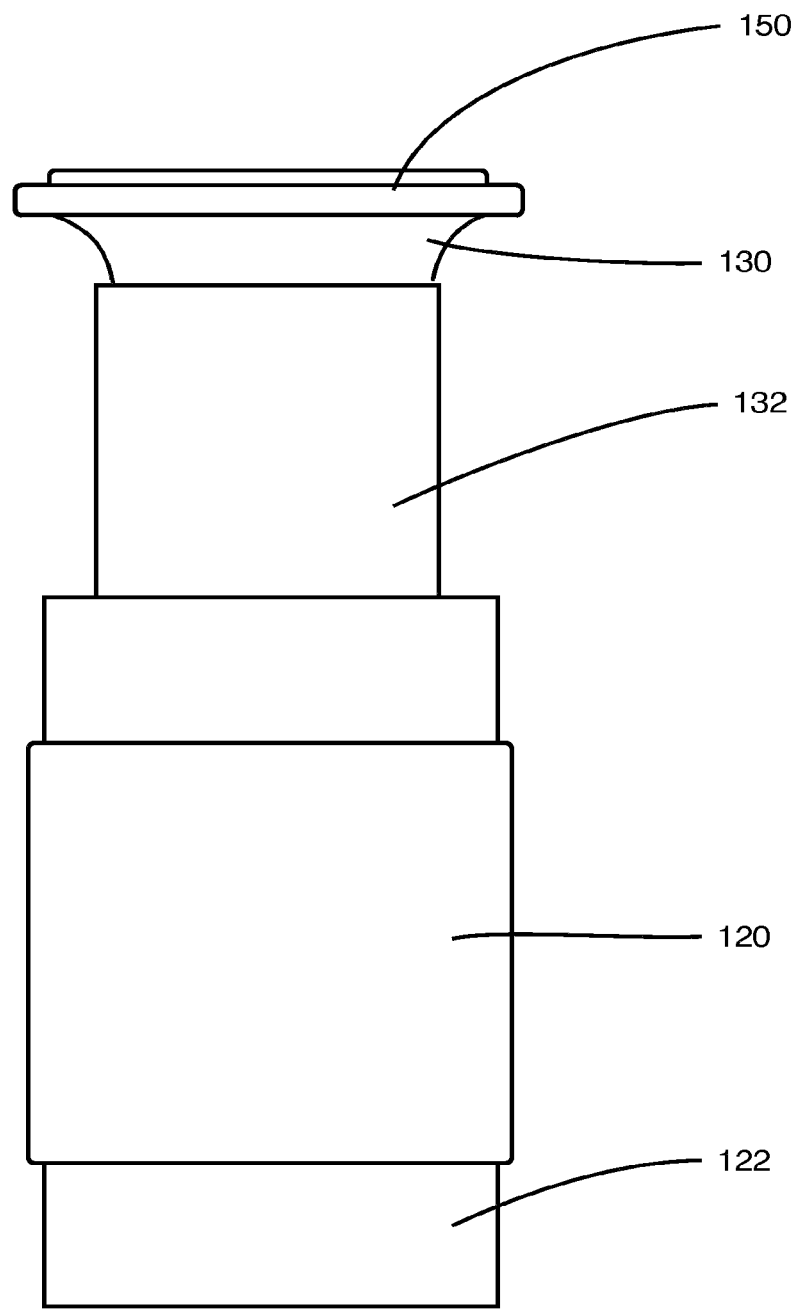
Figure 8C:
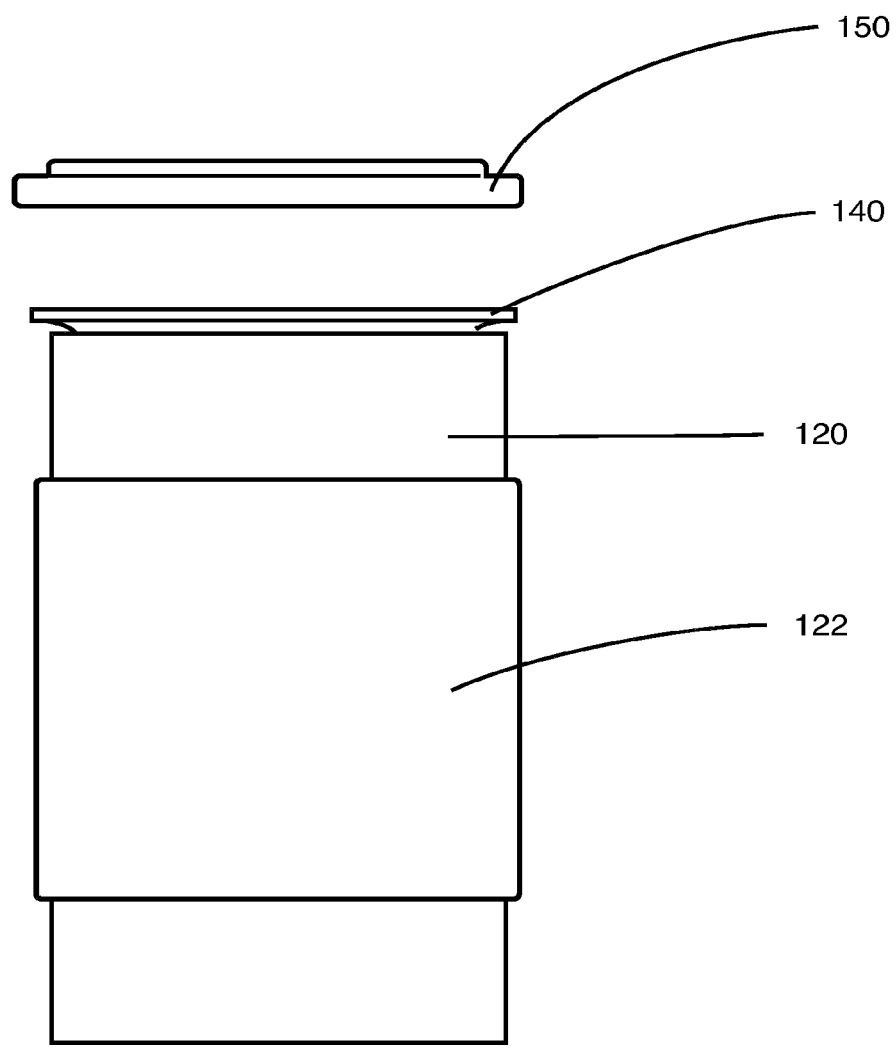

A second embodiment of the beverage filtering system of the present invention is illustrated in FIGS. 8A through 8D. Referring first to FIG. 8A, system 100 includes an outer cup 120 having a sleeve 122 as previously described. Inner cup 130 fits within outer cup 120 as above, both outer cup 120 and inner cup 130 being cylindrical in form. Inner cup 130 in this second embodiment flares outwardly at the top to a diameter larger than that of outer cup 120, thereby limiting the amount by which it may be inserted into the outer cup 120, as shown by the flared rim 140 in FIG. 8C. This feature allows space for the coffee grounds, tea leaves, or other flavoring substance.

Inner cup 130 has a sleeve 132 which includes an integrally formed sealing gasket 134, which functions in the same manner as the O-ring 42 described above. As before, a filter is in the bottom of the inner cup 130, and may be provided in any of several ways.

Figure 8D:
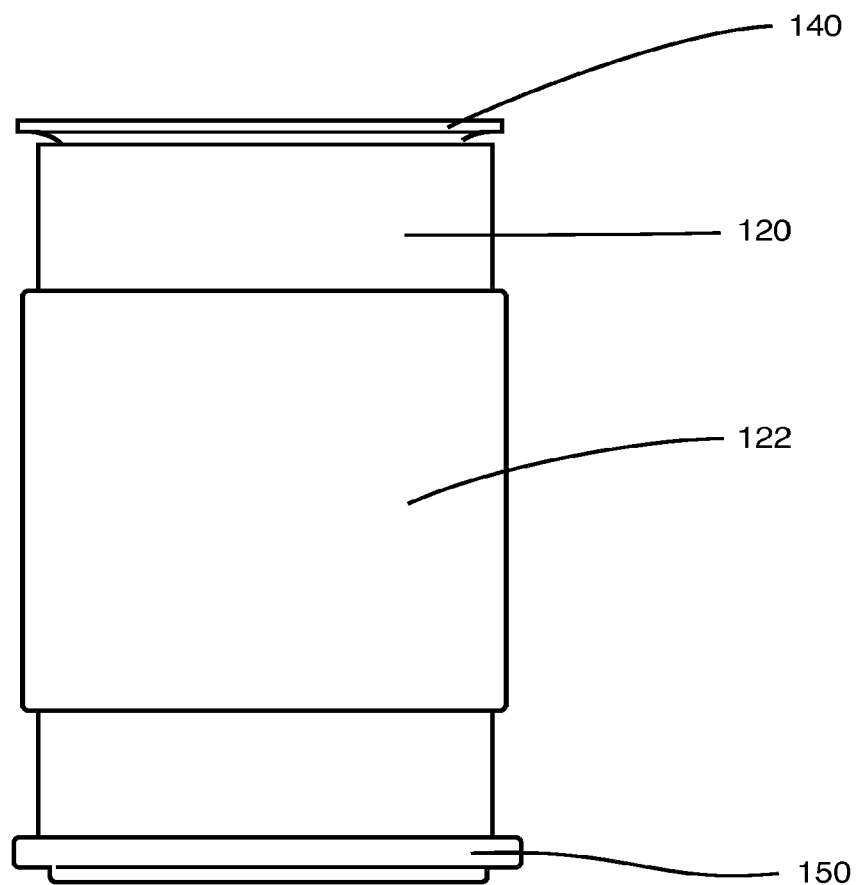

System 100 also includes a lid 150, which may be molded from a plastic material and which may double as a coaster, as shown in FIG. 8D.

Figure 8E:
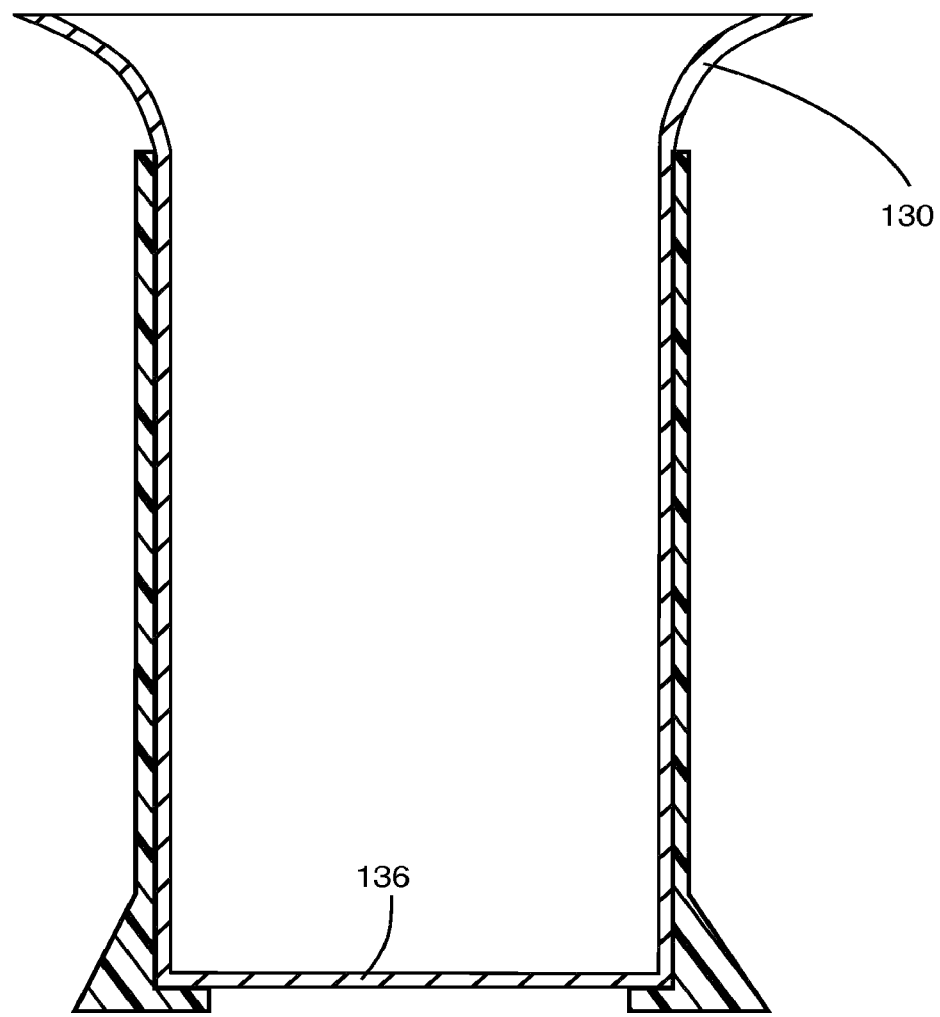
FIGS. 8E through 8H are cross-sectional views of inner cups for the second embodiment of the system.

FIGS. 8E through 8H illustrate the variety of ways in which the filter may be provided in this second embodiment. FIG. 8E is a cross-sectional view of an inner cup 130 having a filter 136 formed by perforations in the very bottom of the inner cup. The perforations are as described above. An enlarged view of this variant is shown in FIG. 9.

Figure 9:
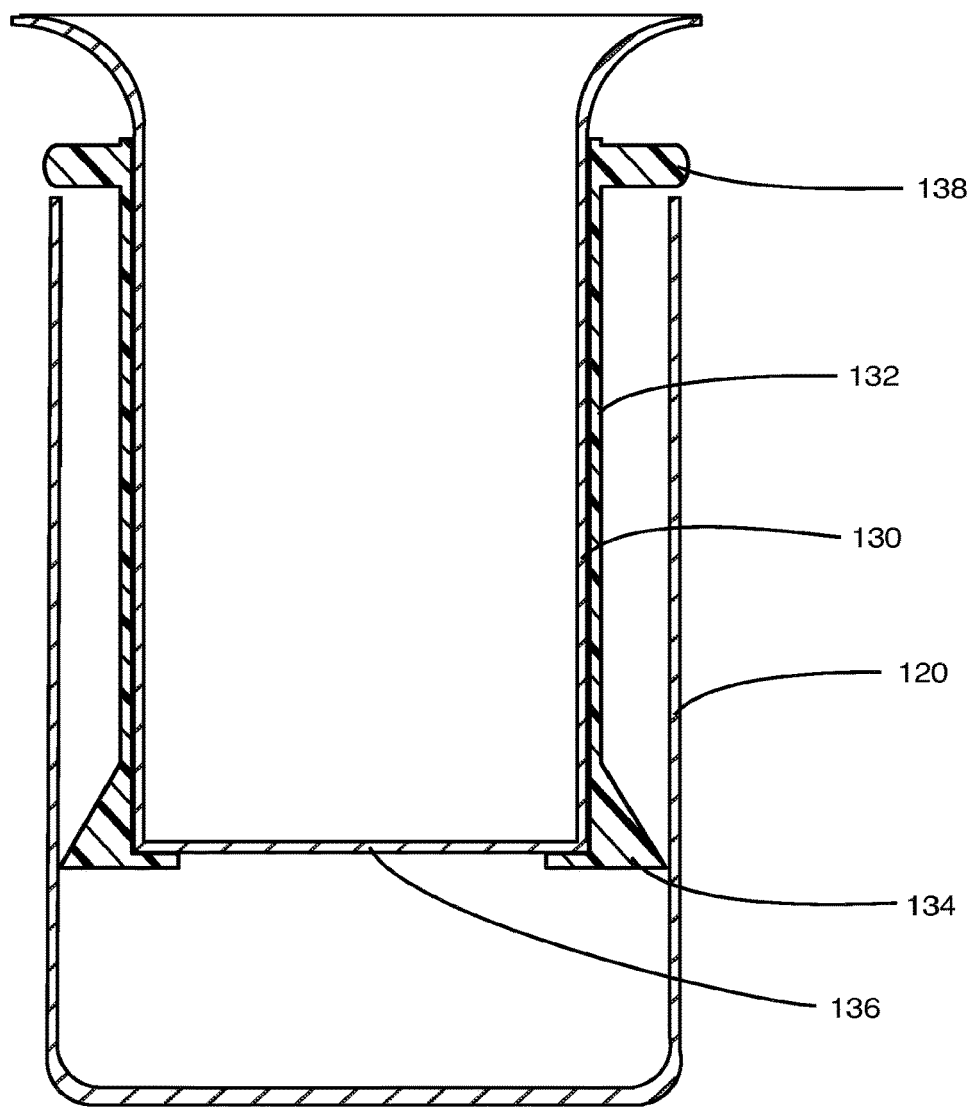
FIG. 9 is an enlarged view of the inner cup shown in FIG. 8E.

Referring to FIG. 9, inner cup 130 has filter 136 in the bottom thereof as shown. Sealing gasket 134 contacts the inner surface of the outer cup 120 creating a seal of the type described above. In addition to sealing gasket 134, sleeve 132 is integrally formed with an optional rim stopper 138, so called because it limits the amount by which the inner cup 130 may be inserted into the outer cup 120 when it abuts against the rim of the outer cup 120. Sleeve 132, together with integrally formed sealing gasket 134 and optional rim stopper 138, is preferably formed from an elastomeric material, such as a silicone rubber.

Figure 8F:
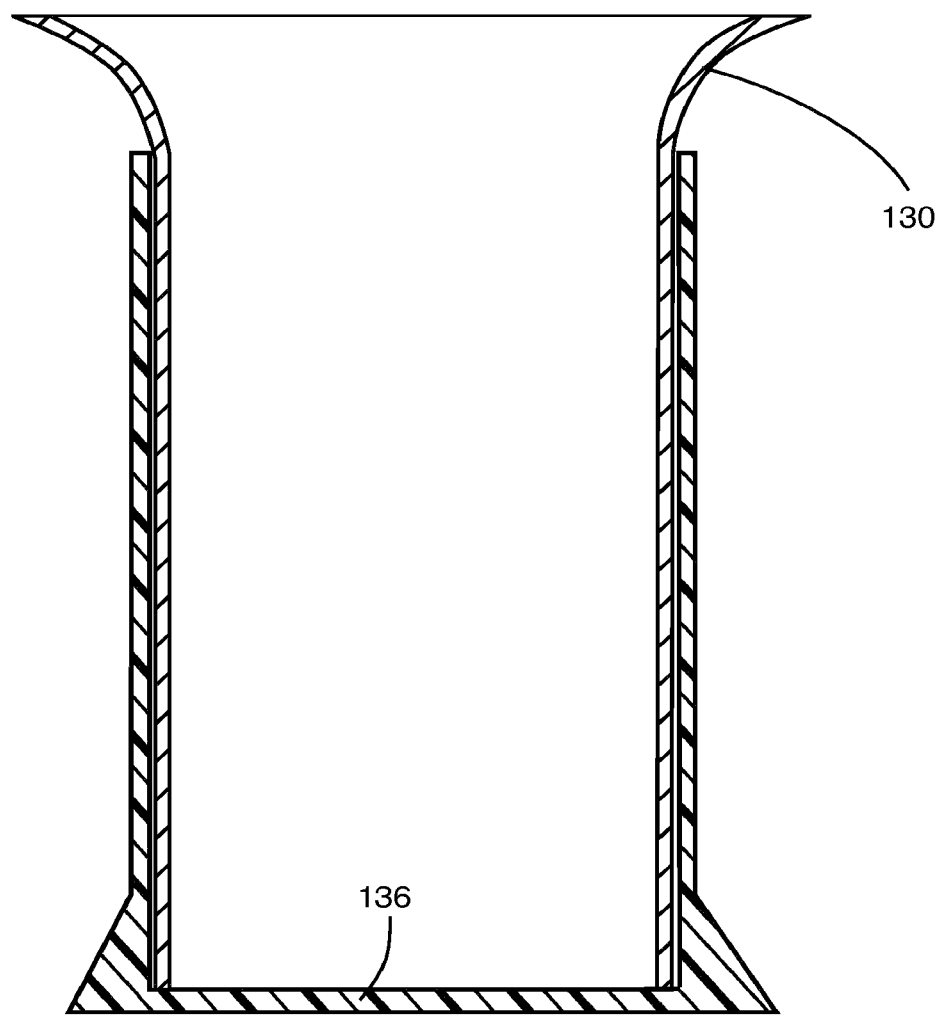
Figure 10:
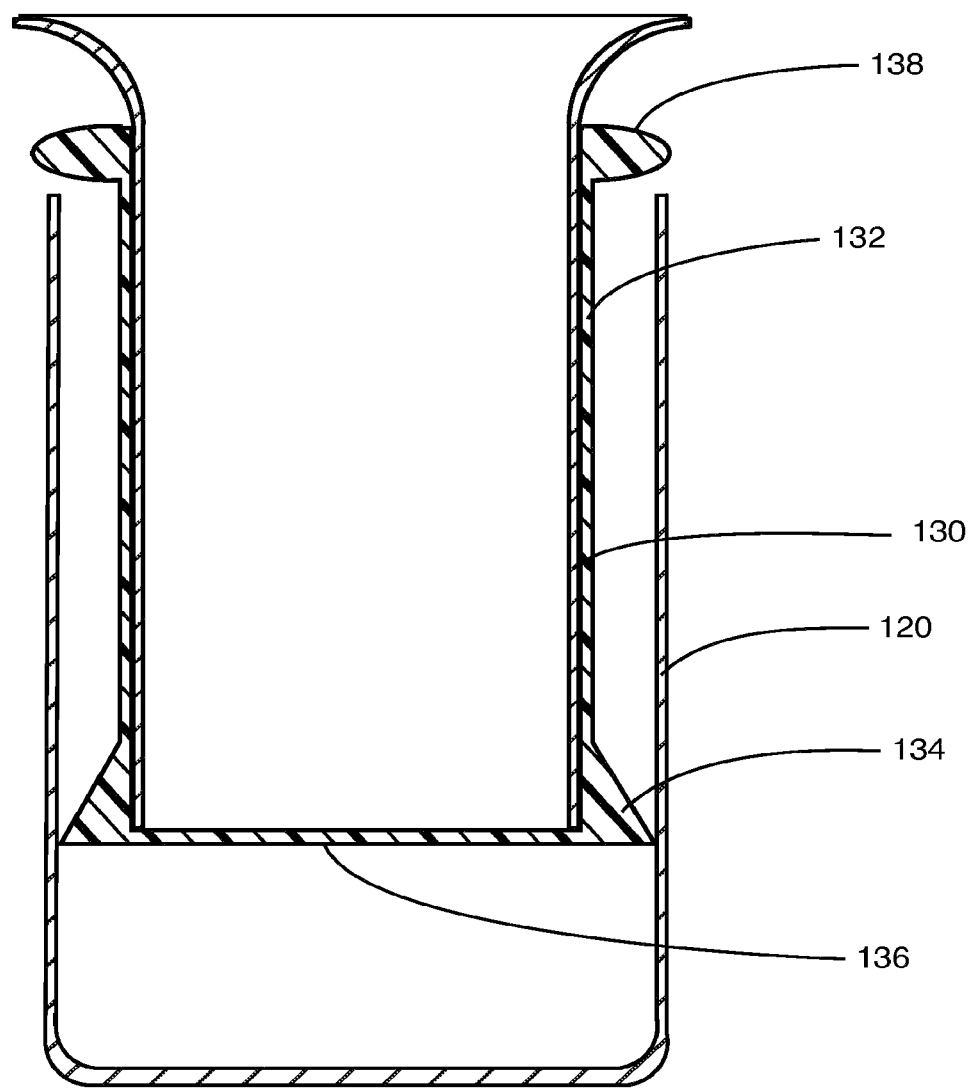
FIG. 10 is an enlarged view of the inner cup shown in FIG. 8F.

FIG. 8F is a cross-sectional view of an inner cup 130 having a filter 136 formed by perforations or slits through the sleeve 132 itself. As enlarged view of this variant is shown in FIG. 10. Referring to FIG. 10, the inner cup 130 is really a tube lacking a bottom. Instead, sleeve 132 provides the bottom and is integrally formed therewith. Perforations or slits are provided through the bottom. As discussed above, the perforations or slits are preferably of a size to permit flavoring oils, such as lipids, to pass through the filter 136 without permitting large particulates of bulky flavoring solids, such as particles of ground coffee, to do so. The perforations preferably have a diameter in the range from 0.2 mm to 0.6 mm. More preferably, the perforations have a diameter of approximately 0.4 mm. The perforations or slits may also be provided with the relative spacing of 1.5 mm discussed above. In other respects, the sleeve 132 is as described above.

Figure 8G:
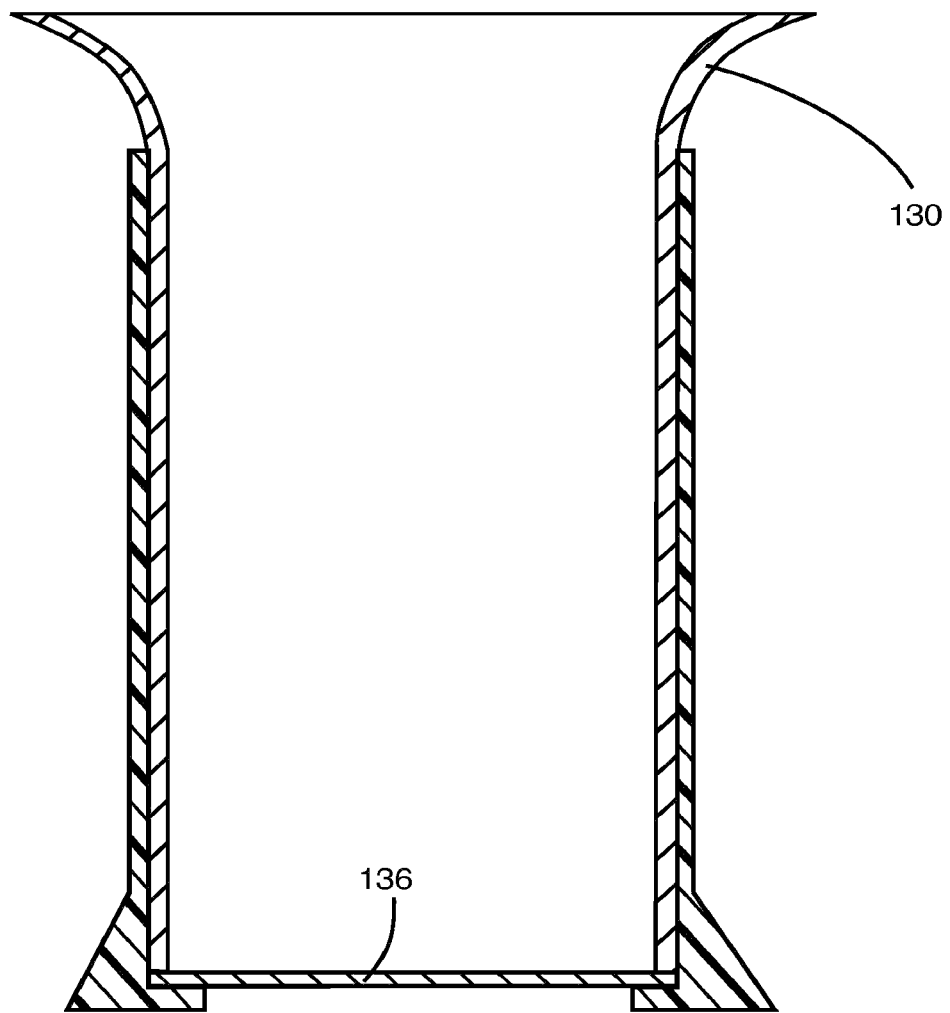
Figure 8H:
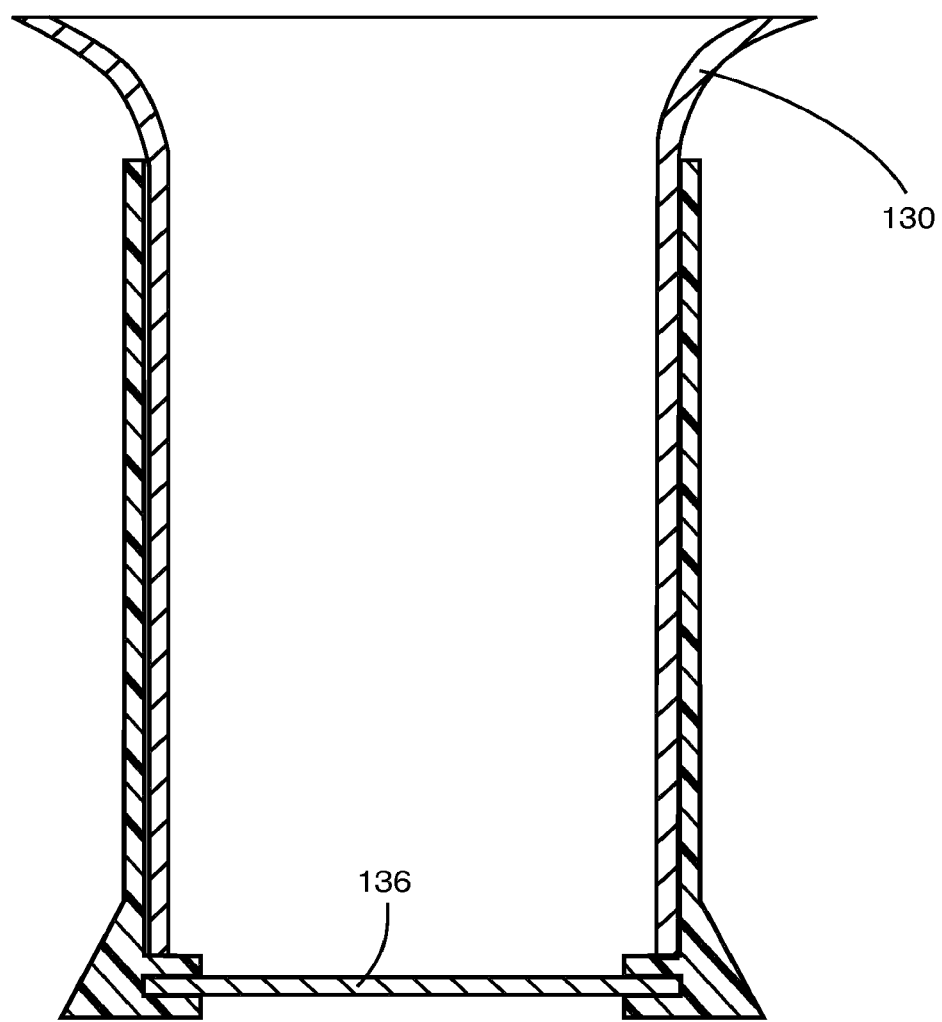
Figure 11:
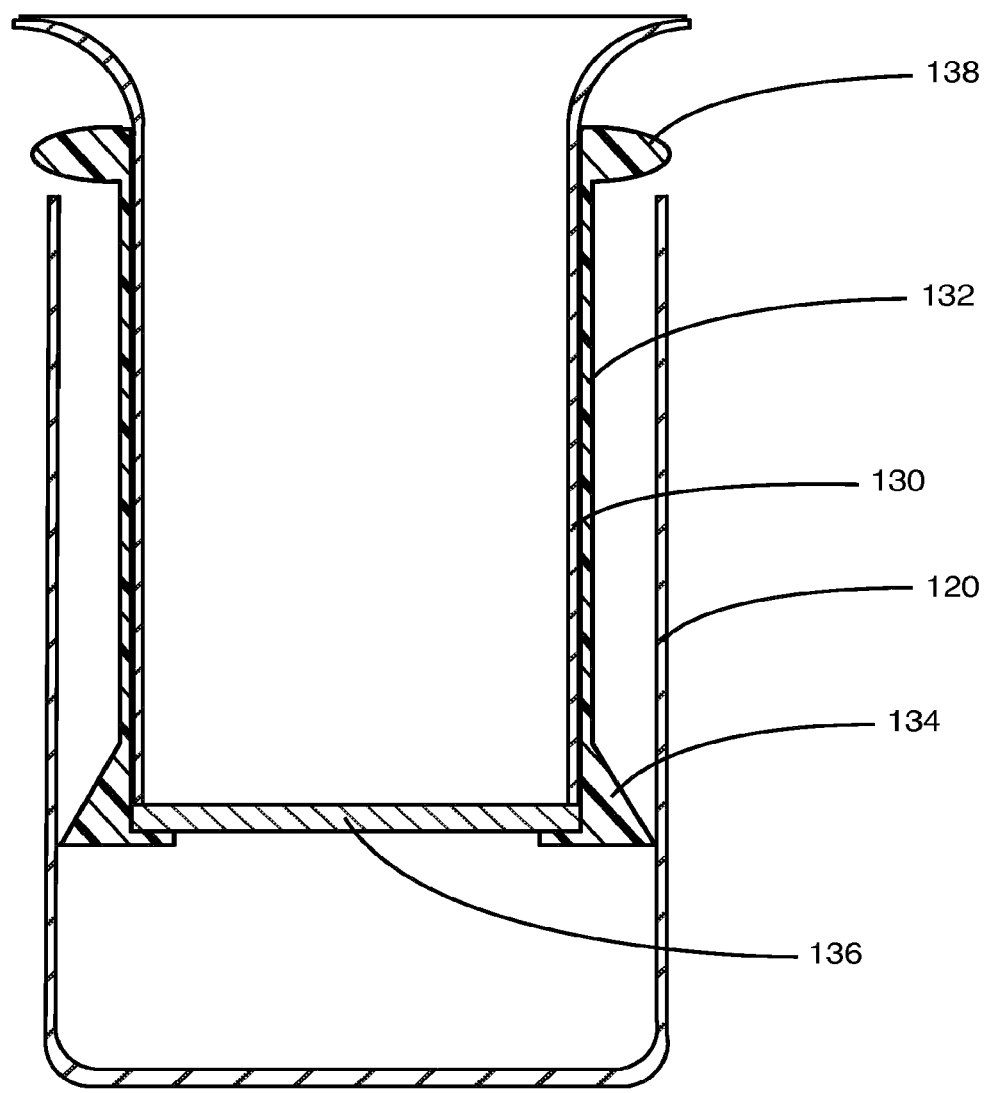
FIG. 11 is an enlarged view of the inner cup shown in FIG. 8G.

In FIGS. 8G and 8H, the filter 136 is an element separate from the inner cup 130 and sleeve 132. Both FIGS. 8G and 8H are cross-sectional views of such an inner cup 130. An enlarged view of the variant shown in FIG. 8G is shown in FIG. 11. Referring to FIG. 11, the inner cup 130 is again really a tube lacking a bottom. Instead, sleeve 132 holds a separate filter element against the bottom of the tube. The filter 136 may be of glass, steel, plastic, or silicone rubber, and may have perforations of the sizes and relative spacing described above. In other respects, the sleeve 132 is as described above. The difference between the embodiments shown in FIGS. 8G and 8H is that, in FIG. 8G, the filter 136 is held against the bottom of inner cup 130 by the sleeve 132, while, in FIG. 8H, the filter 136 is held within sleeve 132 and is not in direct contact with the inner cup 130.

Figure 12A:
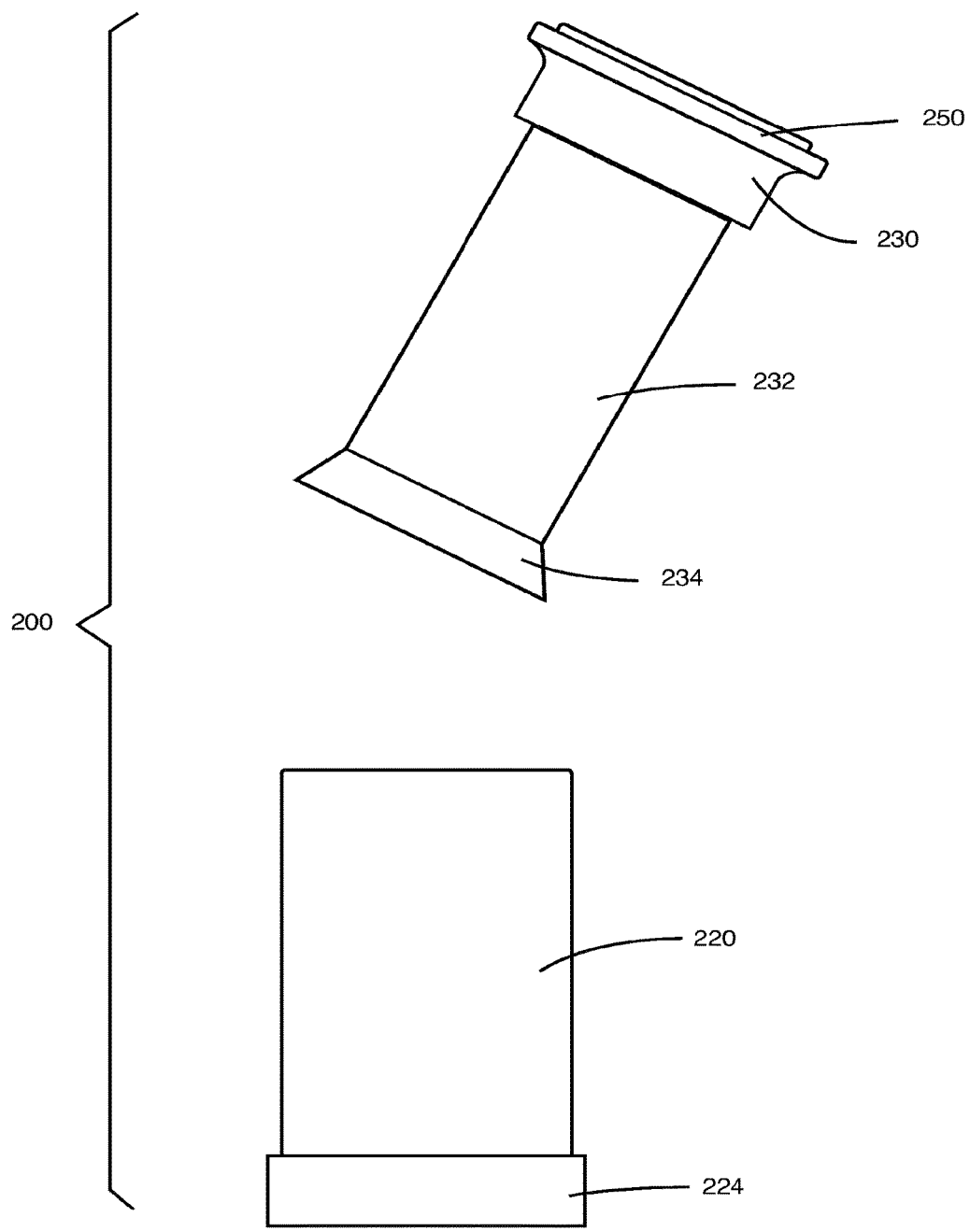
FIGS. 12A through 12E illustrate a third embodiment of the beverage filtering system.
Figure 12B:
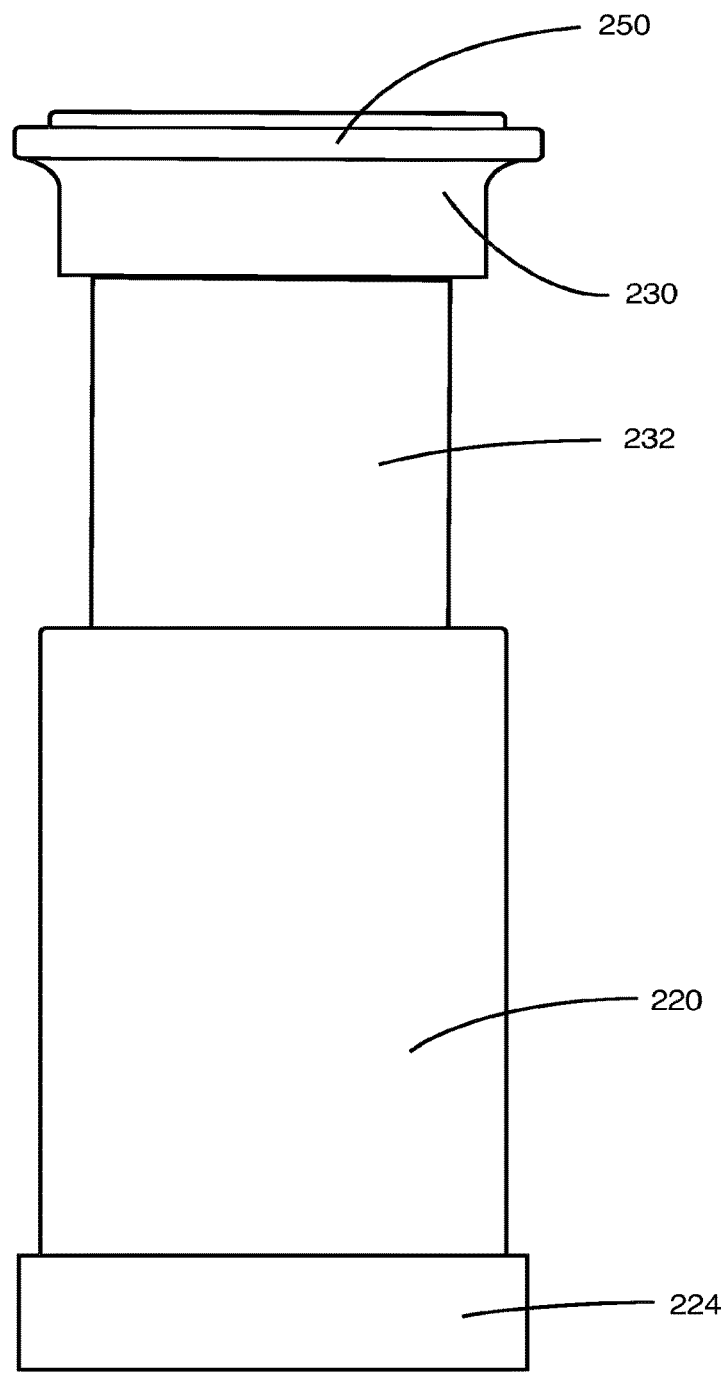
Figure 12E:
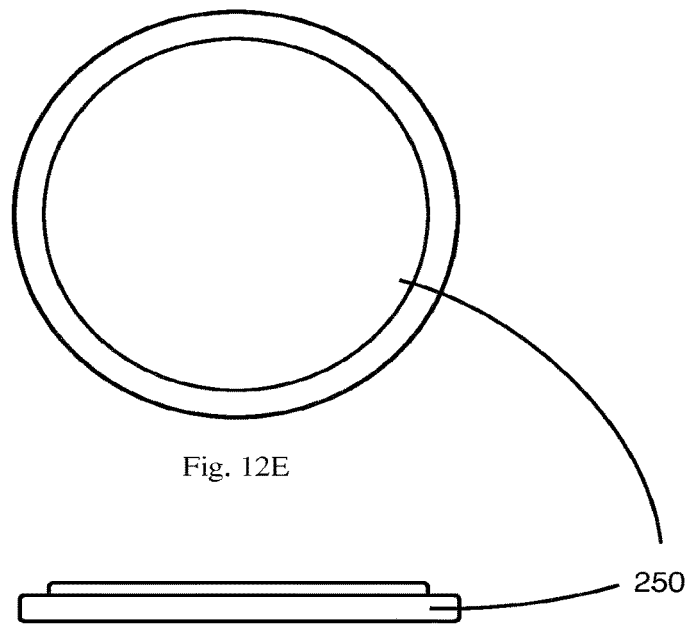
Figure 12C:
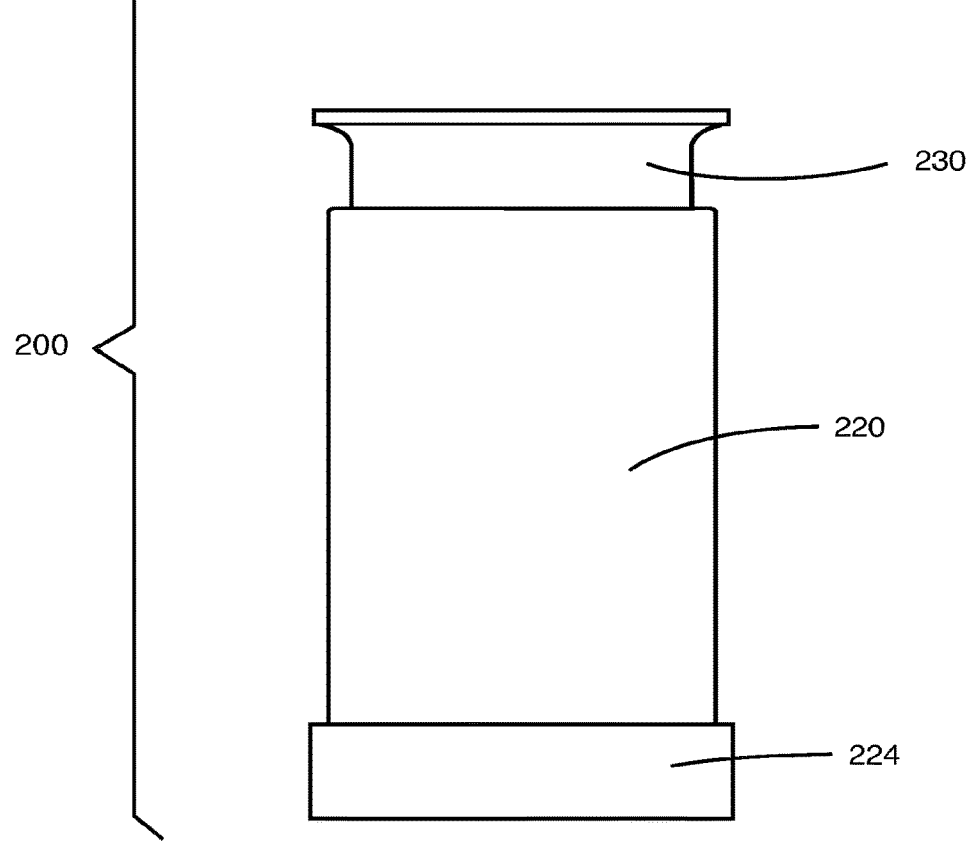
Figure 12D:
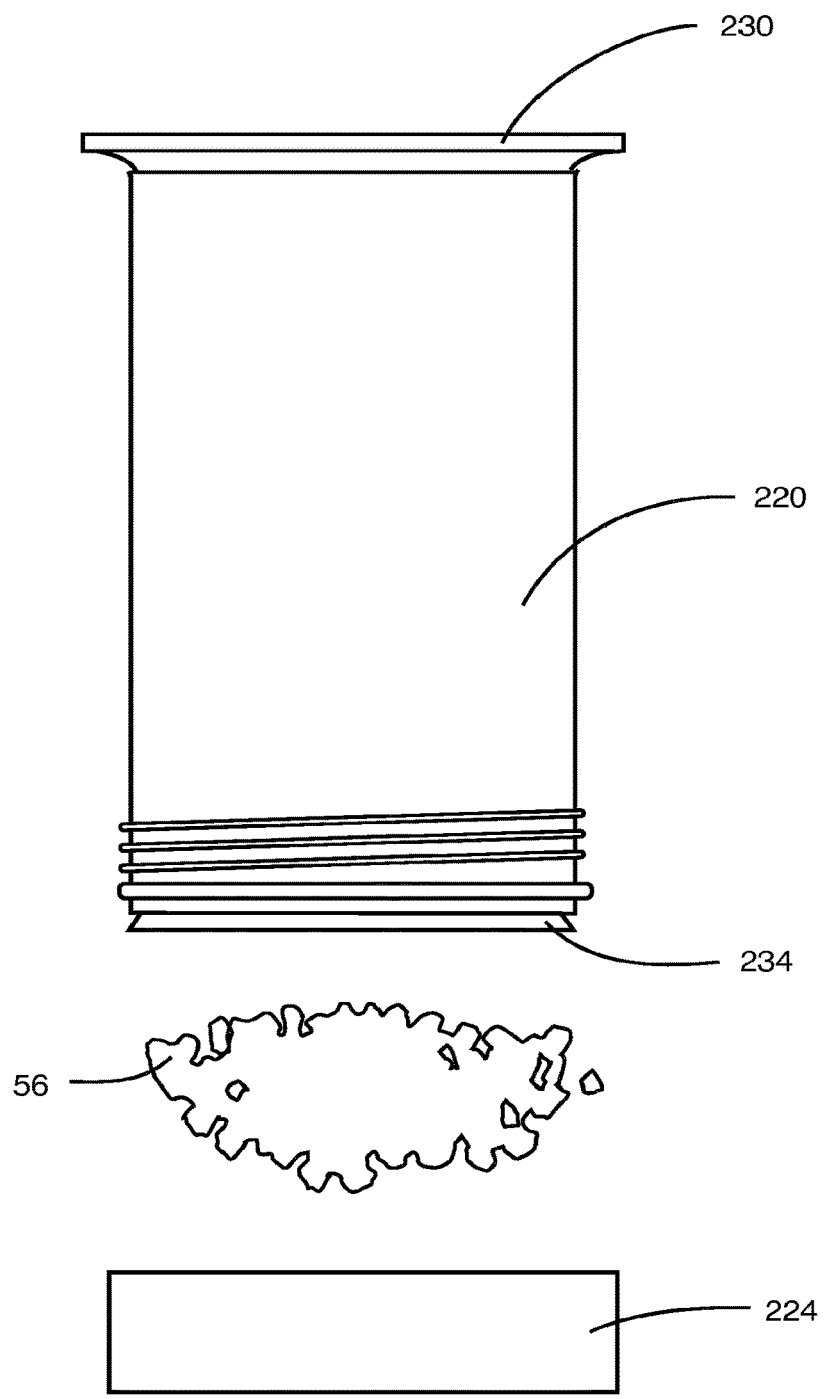

A third embodiment of the beverage filtering system of the present invention is illustrated in FIGS. 12A through 12E. Referring first to FIG. 12A, system 200 has an outer cup 220 having a bottom portion 224 which is removable. As shown in FIG. 12D, bottom portion 224 may be screwed off of outer cup 220 to remove used ground coffee 56 or the like therefrom.

Inner cup 230 has a sleeve 232 integrally formed with a sealing gasket 234. Sleeve 232 is as described above. Inner cup 230 flares outwardly at the top to accommodate lid 250, which may be snapped thereon. A plan view of lid 250 is shown in FIG. 12E.

When the inner cup 230 is pushed down into outer cup 220 during the preparation of a beverage, as shown in FIG. 12B, the bottom of the inner cup 232 and sealing gasket 234 presses the material, such as ground coffee 56 against the bottom of the outer cup 220. Subsequently, the bottom portion 224 is removed, and the inner cup 230 is pushed all the way down to its flared top, enabling the sealing gasket 234 to push the used coffee grounds 56 out, preferably into the garbage. Bottom portion 224 may be threadingly connected to outer cup 220.

Figure 13:
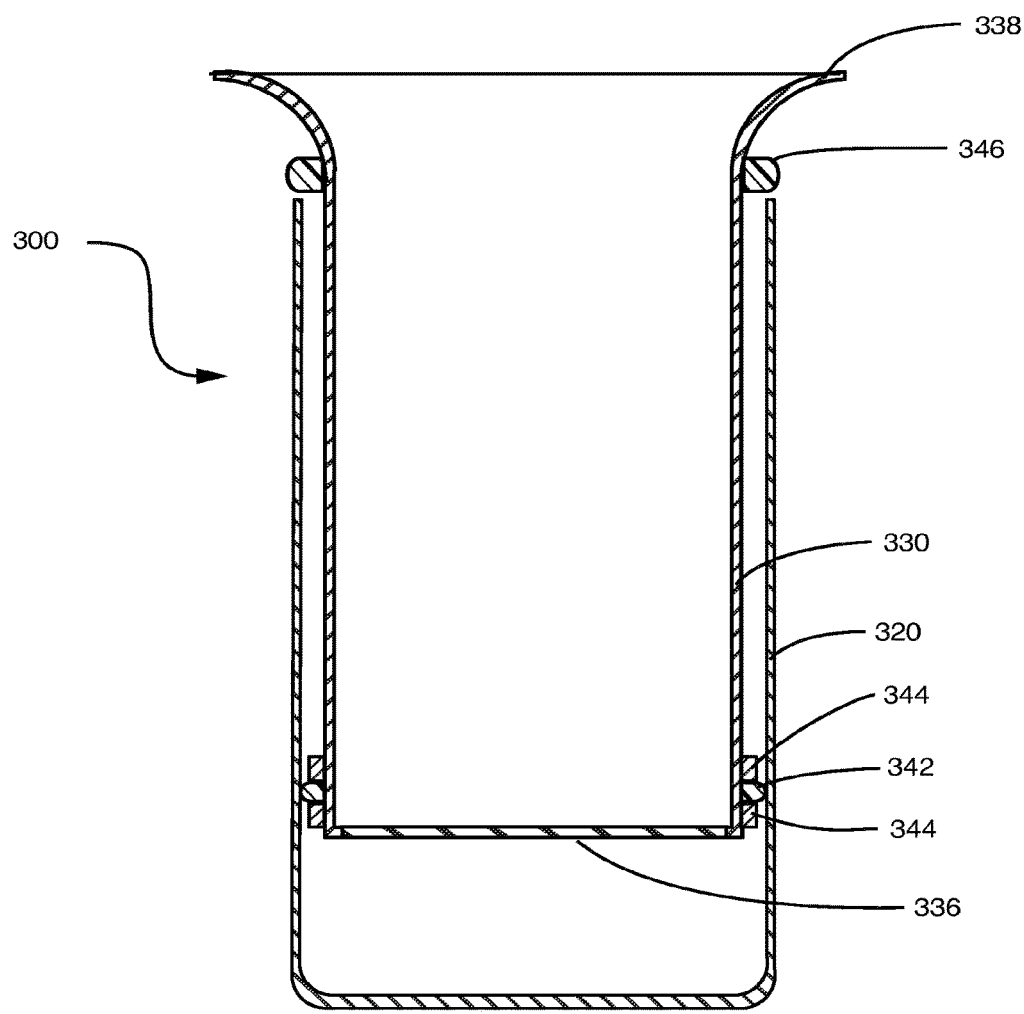
FIG. 13 illustrates a fourth embodiment of the beverage filtering system.

A fourth embodiment of the beverage filtering system of the present invention is illustrated in FIG. 13. System 300 has an outer cup 320 and an inner cup 330, which is within the outer cup 320 in the cross-sectional view of FIG. 13. Filter 336, which may be perforated as previously described, is at the bottom of the inner cup 330. O-ring 342, which may be of an elastomeric material, such as silicone rubber, is secured between retaining rings 344, which may be of stainless steel, at the lower end of the inner cup 330. O-ring 342, as above, seals the space between the inner cup 330 and the outer cup 320. Inner cup 330 has an outward flare 338 at its upper end. Below the outward flare 338 is an O-ring 346, which functions as a rim stopper for limiting the amount by which the inner cup 330 may be inserted into the outer cup 320.

Figure 14:
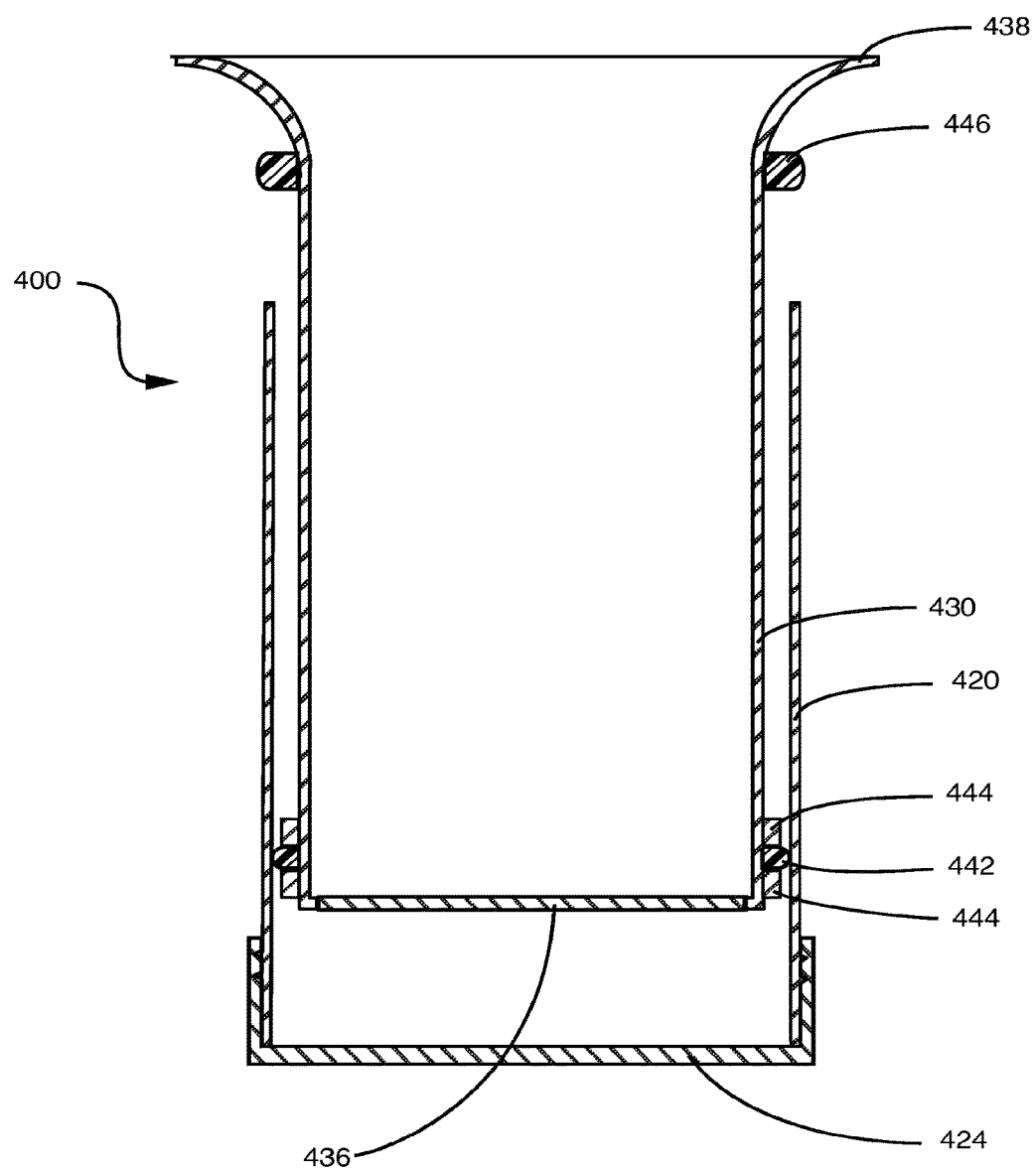
FIG. 14 illustrates a fifth embodiment of the beverage filtering system.

A fifth embodiment of the beverage filtering system of the present invention is illustrated in FIG. 14. System 400 has an outer cup 420 and an inner cup 430, which is within the outer cup 420 in the cross-sectional view of FIG. 14. Outer cup 420 has a removable bottom portion 424, which may be screwed off the outer cup 420 for the purpose previously described above, namely, to remove coffee grounds or other materials after the brewed liquid has been consumed. Bottom portion 424 may be threadingly connected to outer cup 420. Filter 436, which may have perforations of the sizes and relative spacing previously described, is at the bottom of the inner cup 430. O-ring 442, which may be of an elastomeric material, such as silicone rubber, is secured between restraining rings 444, which may be of stainless steel, at the lower end of the inner cup 430. O-ring 442, as above, seals the space between the inner cup 430 and the outer cup 420. Inner cup 430 has an outward flare 438 at its upper end. Below the outward flare 438 is an O-ring 446, which functions as a rim stopper for limiting the amount by which the inner cup 430 may be inserted into the outer cup 420.

Figure 15:
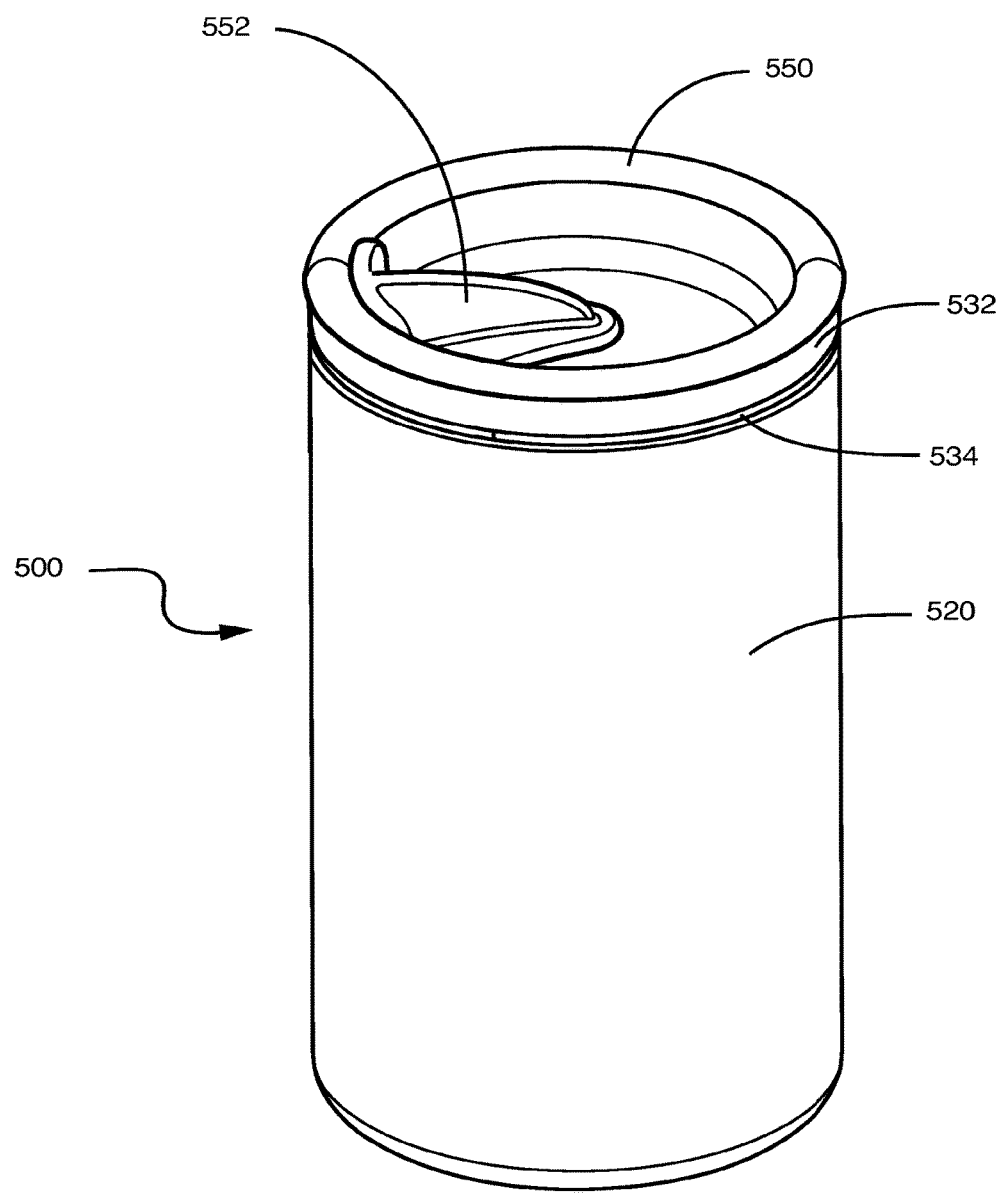
FIG. 15 is a perspective view of a sixth embodiment of the beverage filtering system.

A sixth embodiment of the beverage filtering system of the present invention is shown in FIGS. 15 through 19. Referring first to FIG. 15, system 500 includes an outer cup 520, an inner cup 530, only the rim 532 of which is visible in FIG. 15, and a lid 550. Lid 550 has a stopper 552 to seal a hole through which a beverage may be consumed.

Figure 16:
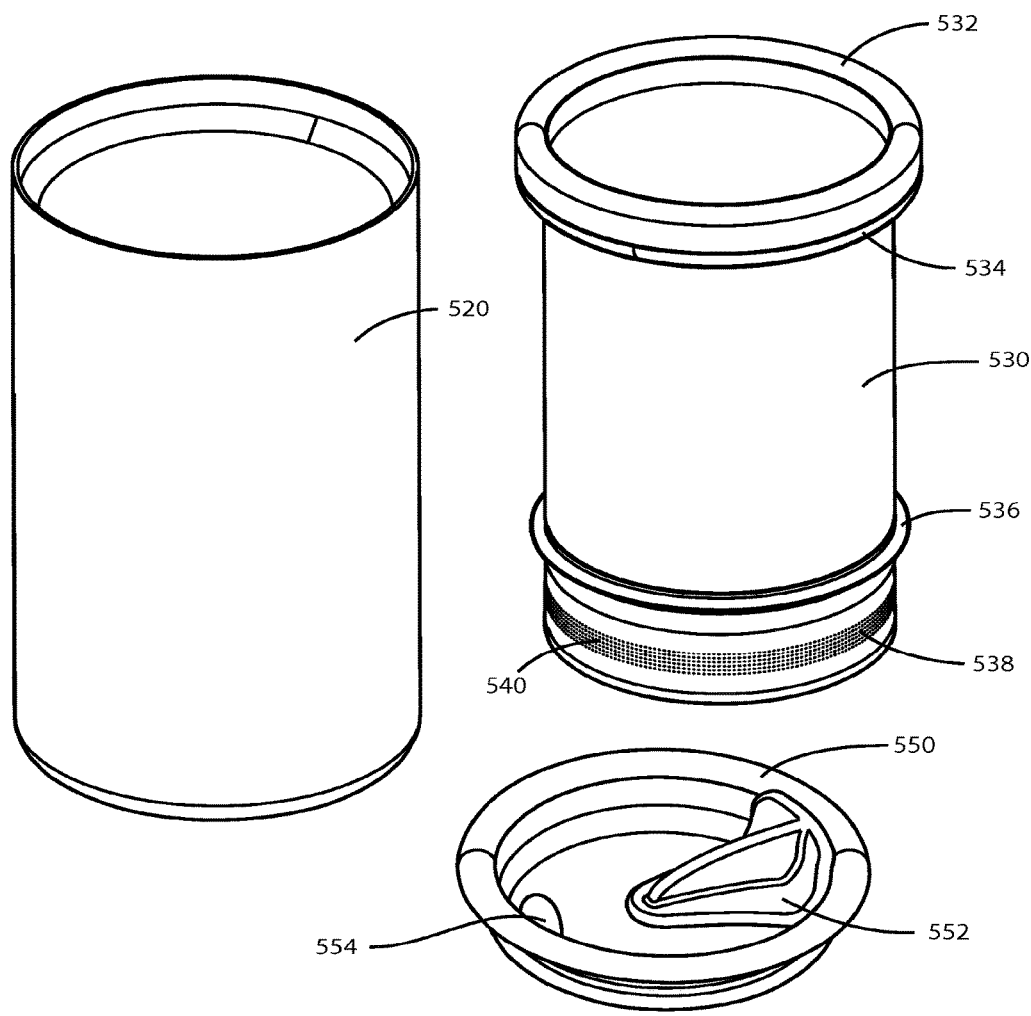
FIG. 16 is a perspective view of the components of the sixth embodiment.

FIG. 16 shows the separate components of system 500. Referring first to lid 550, stopper 552 is of the variety which is secured at the center of the lid 550, and which may be swiveled therearound to alternately cover and uncover hole 554 for drinking.

Inner cup 530 has a rim 532, beneath which is an O-ring 534 which limits the amount by which inner cup 530 may be inserted into outer cup 520. O-ring 534 may be made of an elastomeric material, such as silicone rubber.

The lower portion of the inner cup 530 includes an O-ring 536, which seals the space between the outer cup 520 and the inner cup 530. As above, O-ring 536 may be of an elastomeric material, such as silicone rubber. Below O-ring 536, in the lower portion of the wall of the inner cup 530, are perforations 538 which all together act as filter 540. Compared to the embodiments previously described, filter 540, located on the side, rather than on the bottom, of inner cup 530 permits the passage of fluids more readily than one on the bottom of the inner cup 530 because it is not as readily blocked by coffee grounds or other materials. Perforations 538 have the sizes and relative spacing previously described.

Figure 17:
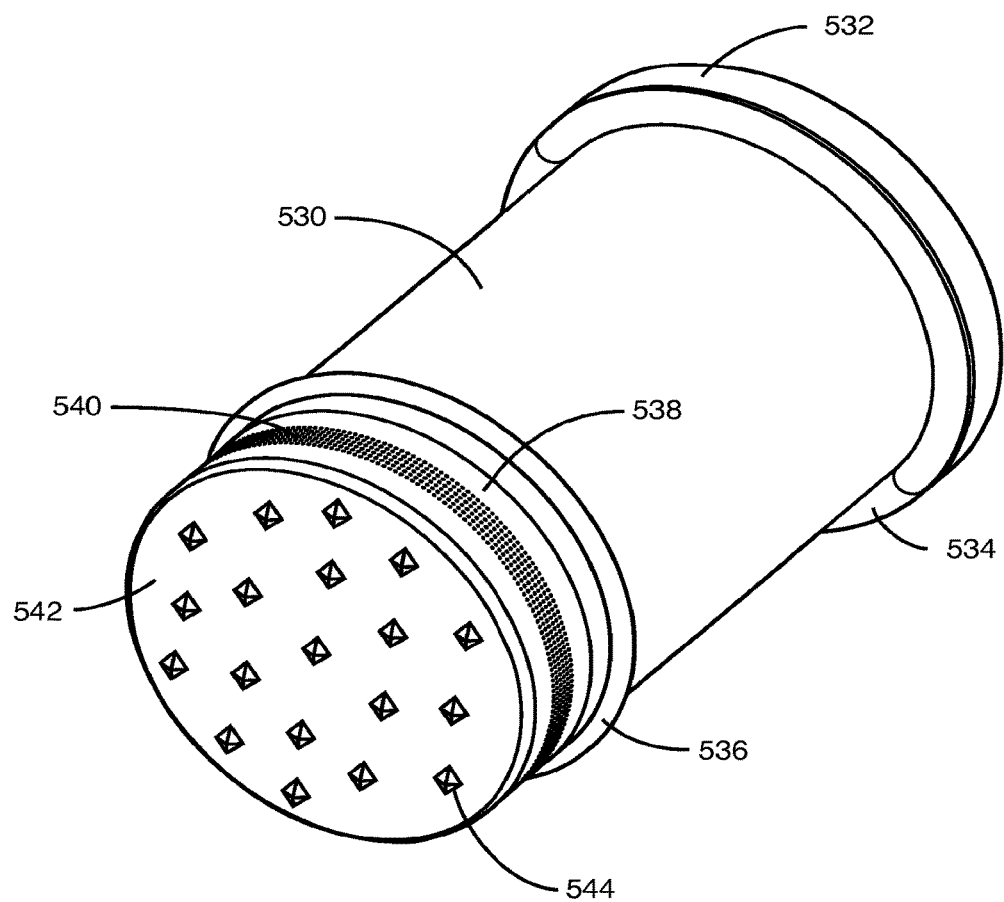
FIG. 17 is a bottom perspective view of the inner cup of the sixth embodiment.

FIG. 17 is a bottom perspective view of inner cup 530. On the bottom 542 of inner cup 530 are a plurality of downwardly projecting studs 544, which may be of the pyramidal shape illustrated. These pointed studs 544 aid in tearing, compressing, or otherwise compressively treating the material being infused into a drink. As shown in FIG. 17, studs 544 are in a spaced hexagonal array, and their size, shape, number, and relative spacing may be varied without departing from the scope of the present invention.

Figure 18:
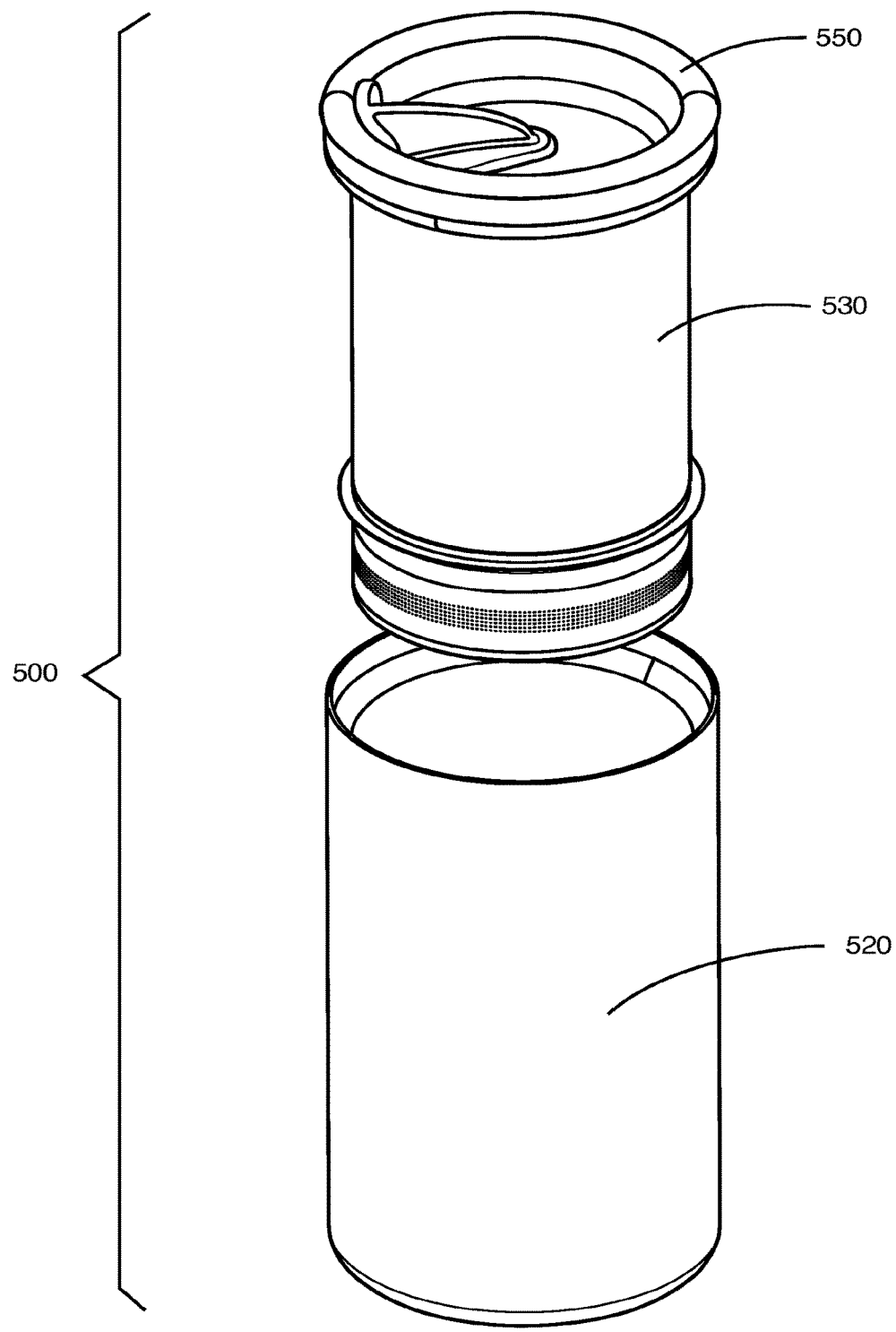
FIG. 18 is an exploded view of the sixth embodiment of the present invention.

Finally, FIG. 18 is an exploded view of system 550.

Figure 19:
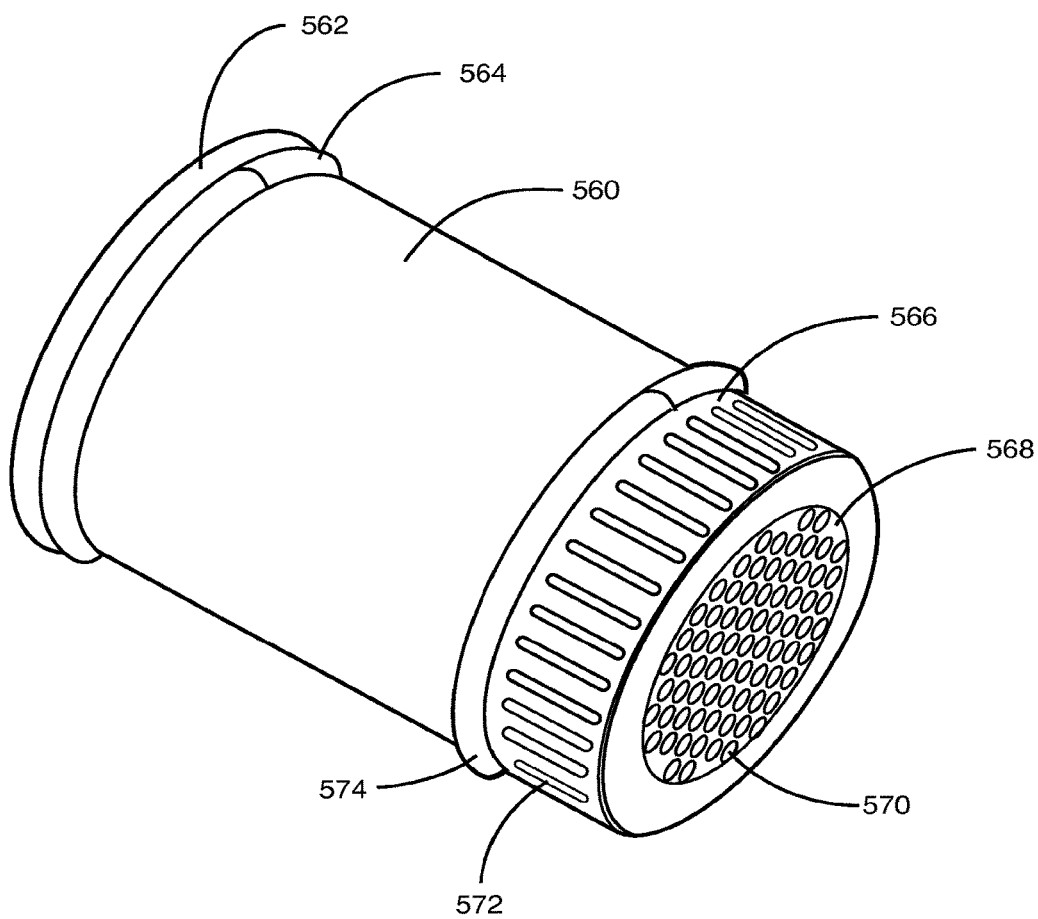
FIG. 19 is a perspective view of an alternative inner cup for the sixth embodiment.

FIG. 19 is a perspective view of an alternative inner cup 560 for system 500. As above, inner cup 560 has a rim 562 and O-ring 654, which is made of an elastomeric material, such as silicone rubber. A bottom portion 566, including a filter 568 is threadingly connected to the inner cup 560 to facilitate cleaning. Filter 568 is formed from a plurality of perforations 570, as previously described. Bottom portion 566 includes ribs 572 to enable bottom portion 566 to be gripped and unscrewed by a user. Above the bottom portion 566 is an O-ring 574, made of an elastomeric material, such as silicone rubber, to seal the space between the inner cup 560 and the outer cup 520, as previously described.

Figure 20:
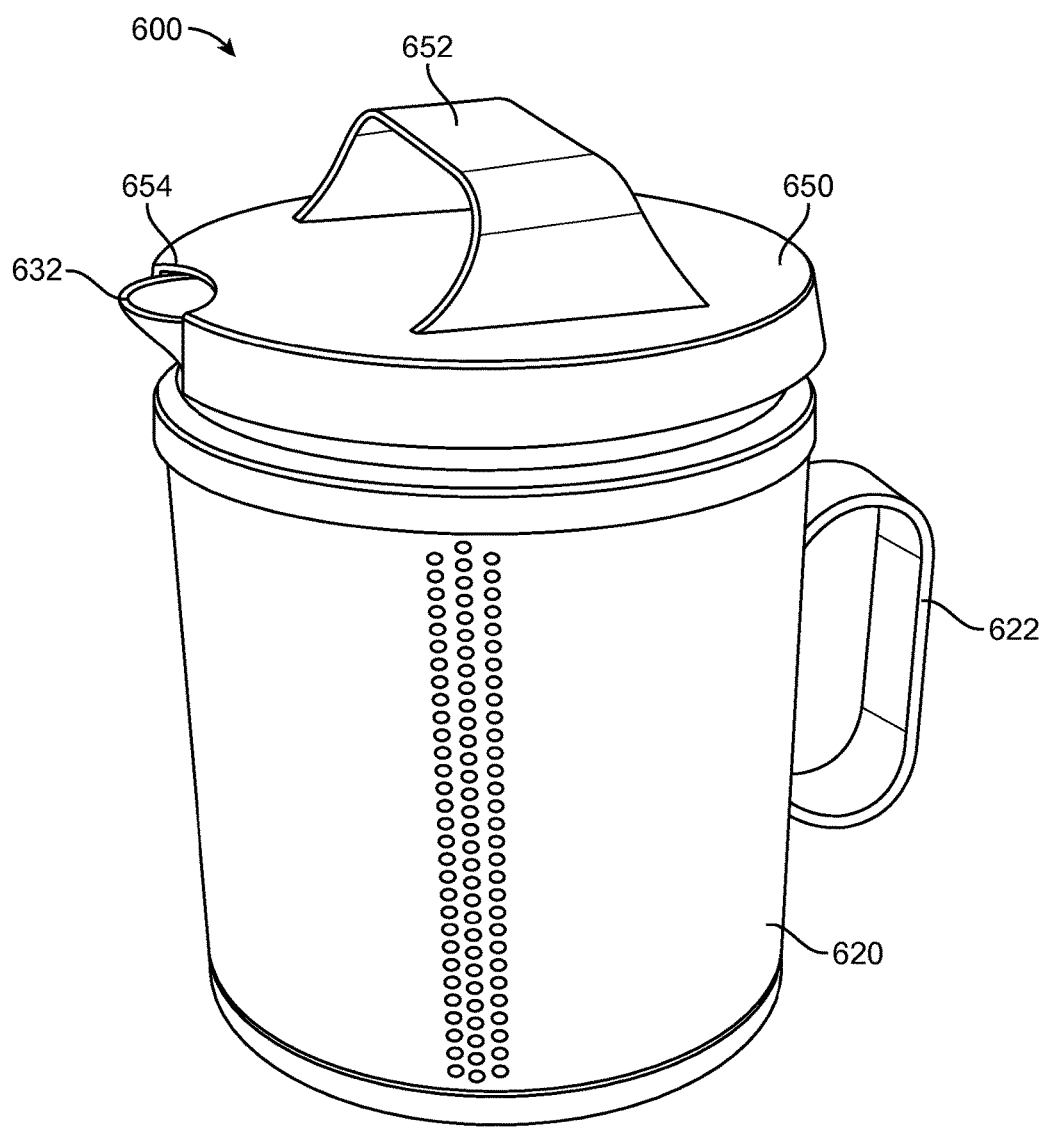
FIG. 20 is a perspective view of an seventh embodiment of the beverage filtering system of the present invention.

FIG. 20 shows a seventh embodiment of the beverage filtering system of the present invention. In its essential details, system 600 is similar to those previously described, except that its components are larger so as to function as a carafe rather than as a drinking cup. Accordingly, outer cup 620 has a handle 622; the inner cup, largely concealed within outer cup 620, has a spout 632 to facilitate the pouring of a liquid contained therein. Finally, lid 650 also has a handle 652 as well as a cut-out portion 654 to accommodate the spout 632.

Figure 21:
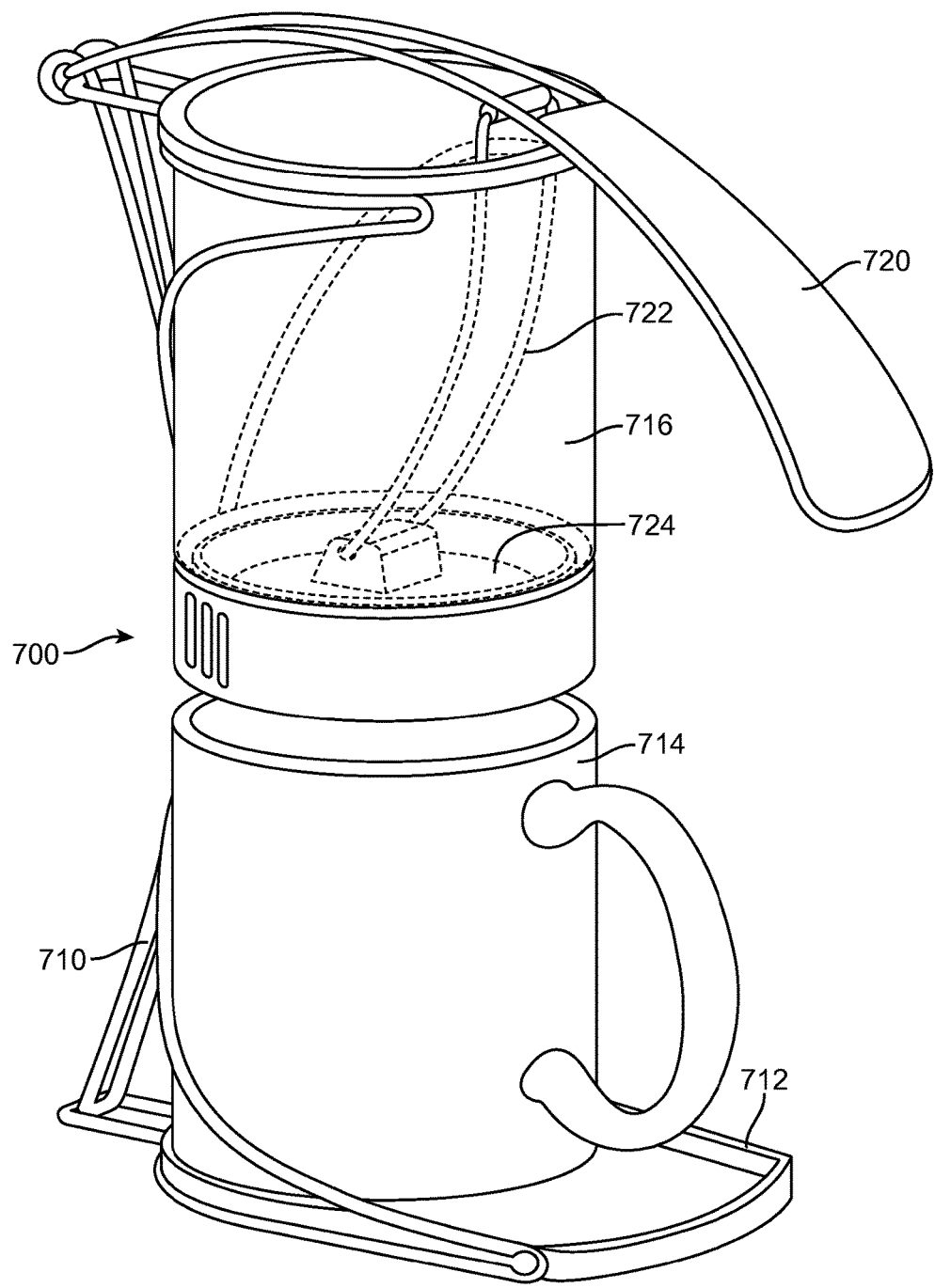
FIG. 21 is a perspective view of an eighth embodiment thereof.

FIG. 21 shows an eighth embodiment of the beverage filtering system of the present invention. System 700 includes a stand 710 having a base 712 where a cup 714 or other drinking container may be disposed to collect a beverage. Above the base 712, a brewing vessel 716 is held by the stand 710. The brewing vessel 716, much like inner cup 560 of FIG. 19, has a bottom portion 718 housing a filter. The filter has perforations having the sizes and relative spacing described above. Handle 720 is used to raise and lower a plunger 724 attached to the lower end of arm 722. To use system 700, handle 720 is raised, water and a material such as ground coffee are placed in the brewing vessel 716, and handle 720 is used to push down plunger 724, thereby forcing a brewed liquid through the filter and into the cup 714 below.

Figure 22:
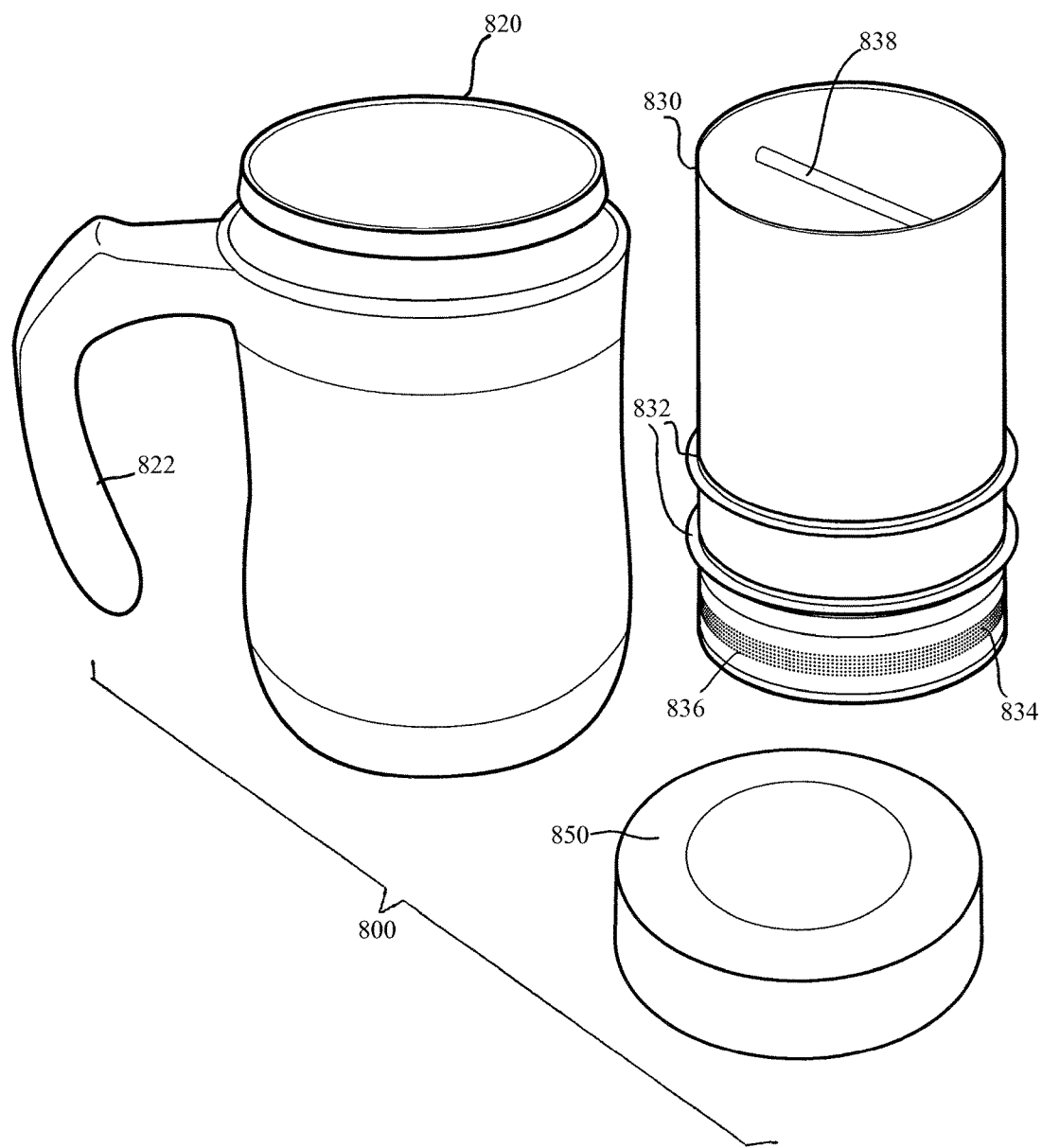
FIG. 22 is a perspective view of the components of a ninth embodiment of the present invention.
Figure 23:
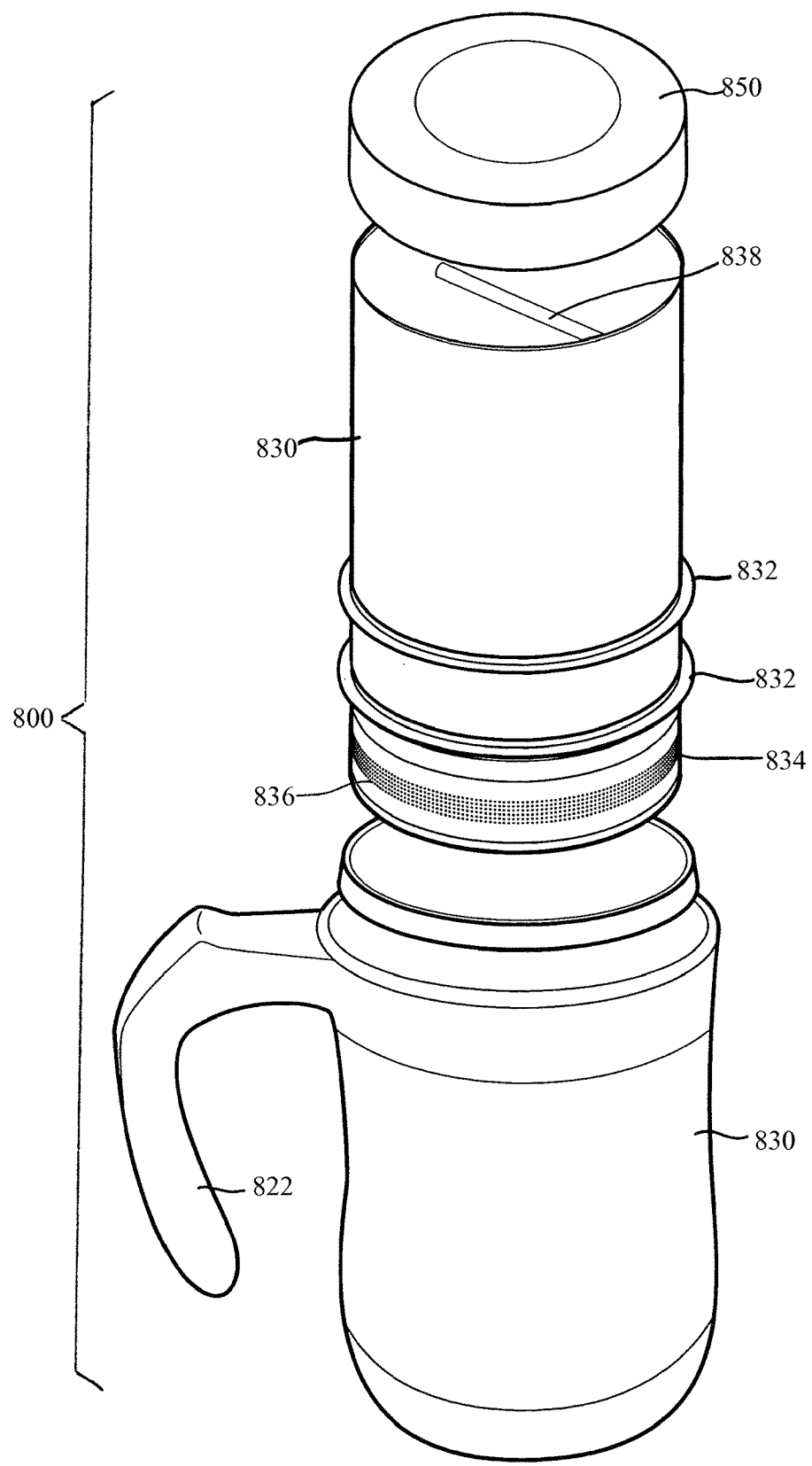
FIG. 23 is an exploded view of the ninth embodiment.

FIG. 22 is a perspective view of the components of a ninth embodiment of the beverage filtering system of the present invention, and FIG. 23 is an exploded view thereof. System 800 includes an outer cup 820, which may be molded from a plastic material and have an integrally molded handle 822. Inner cup 830 has two O-rings 832, which may be wiper-blade-style O-rings, on the lower portion of its side wall, and a filter 834 below the O-rings 832. Filter 834 is formed from perforations 836 of the sizes and relative spacings previously discussed. To facilitate the removal of the inner cup 830 from the outer cup 820 when the inner cup 830 is in a filtered position, inner cup 830 is provided with a gripping means 838, which may be a bar extending across the inside of the inner cup 830 near the top thereof as shown in FIGS. 22 and 23. Lid 850, which may either screw or snap onto the outer cup 820, may be used to push the inner cup 830 into the outer cup 820 from an unfiltered position to a filtered position.

In summary, the present invention consists of at least two nested cups. An outer cup is used to mix water and brew coffee, teas, herbs, or impart other flavorings. After a certain brewing or steeping period, the inner cup is placed inside the outer cup. An inner cup has a perforated bottom and/or side wall and forms a watertight seal against the outer cup with an O-ring or other sealing method.

As the inner cup is pushed into the outer cup, the infused beverage is forced through the filter portion of the inner cup and into the body of the inner cup, filtering beverage from coffee grounds, tea leaves, fruits, etc. This inner cup continues to be pushed into the outer cup until it reaches a fully inserted or filtered position. This fully inserted position is ideally located by a predetermined mechanical stop, preferably by the mating of the top portions of both inner and outer cups, leaving room for the flavoring materials.

In the fully inserted state, most of the liquid has been transferred from the outer cup into the inner cup. The difference between the diameters of the outer and inner cups creates an air space therebetween when the inner cup is in the fully inserted position. The air space forms an insulating barrier, allowing the beverage to be insulated from the ambient temperature of the surroundings, either keeping the beverage colder or hotter for a longer period of time. Also, the insulating effect allows the user to more comfortably hold the device.

In a preferred embodiment, the hole size of the filter portion of the inner cup is sized to dramatically reduce the transfer of any further materials from the outer cup to the inner cup once the inner cup is fully inserted into the outer cup, allowing the beverage to retain the same flavor over time by virtue of surface tension, effectively creating a one-way valve that only operates in the open state when the inner cup is being actively pushed downward. In the case of coffee or tea, this would prevent the coffee or tea from becoming bitter over time.

The outer cup may also be fitted with a sleeve that may further insulate the overall device. The sleeve may be solid or perforated, and may be made of polymers, textiles, woods, or metal. The sleeve could be made in one or several parts, and would provide customization options for colors, logos, or other options.

The invention is directed to a set of nesting cups that can filter beverages as well as become a drinking or serving vessel for the beverage. As shown in the drawings, the main components of the invention are an outer cup, an inner cup and, in some cases, a lid.

The outer cup preferably is made of one or two pieces of rigid material like steel, glass or plastic. In a preferred embodiment, the inner surface of the outer cup is cylindrical or of a similar shape with vertical sidewalls to provide a continuous sealing surface as the inner cup is inserted.

The inner cup preferably is made of one or two pieces of rigid material like steel, glass or plastic. In a preferred embodiment, the filter is at the bottom of the inner cup. In an ideal embodiment, the inner cup incorporates a sealing ring that forms a watertight seal against the inner surface of the outer cup.

The inner cup assembly creates a watertight seal against the inner surface of the outer cup. In one embodiment, this seal is created by having an elastomeric O-ring captured by the inner cup assembly, similar to many piston/bore configurations. Alternatively, multiple O-rings and O-rings having a variety of cross-sectional shapes may be used. Other alternatives are to use wiper-blade-like surfaces which maintain a good seal even with tolerance variations.

The lid may be made of one or two pieces of rigid material like steel, glass or plastic. In one embodiment, the lid incorporates a sealing ring to create a watertight seal against the inside of the inner cup, thereby preventing the lid from leaking, and allowing the beverage to flow only through the sipping hole. The sipping hole may be fitted with a sealing plug to prevent unwanted leaking during transport of the full device. A vent hole may also be provided to allow better flow through the sipping or pouring holes and enable less resistance as the inner cup is moved from the unfiltered position to the filtered position.

The lid may also be of an elastomeric material to create a snap-fit and watertight seal to the inner cup. In one embodiment, the elastomeric lid includes a sipping hole and vent hole. In another embodiment, the sipping and vent holes include a built-in stopper to prevent unwanted leaking during transport of the full device.

The outer cup may be composed of two pieces that allows easier cleaning of the outer cup once the beverage is dispensed.

In operation, water and flavoring solids, such as coffee grounds, are placed into the outer cup. The mixture can be stirred or agitated as desired to assist the infusion or brewing process. When the solids have been sufficiently infused into the beverage, the inner cup is placed into the outer cup, and the lid is placed onto the inner cup. The inner cup may be placed in the outer cup in an unfiltered position, where the bottom of the inner cup is above the level of the liquid in the outer cup. This can allow any agitation of the liquid to enhance the steeping or brewing without spilling. The lid and inner cup are then pressed into the outer cup, forcing the solution of solids and liquid to be filtered through the filter of the inner cup. The finished beverage is thereby transferred to the inner cup, while the solids remain in the outer cup.

The nested cups can be sized so that the combined and fully inserted assembly provides a drinking container, so that no other drinking utensil is required.

Cleaning is easily accomplished by pouring out the relatively dry flavor solids from the outer cup and rinsing off the inner cup. Alternatively, in some embodiments, the bottom of the outer cup is removable for easy disposal of the solids and cleaning.

The filter portion of the device may be made from a finely perforated metal or, alternatively, an elastomeric medium, such as silicone, perforated with holes to create a very fine valve-type filter system that only opens under exerted pressure.

The filter portion of the device may also be comprised of a carbon filter, filter paper, or other filtration media, that can filter the smallest elements from the water, including bacteria, viruses and other microbes. In this embodiment, the device may be used to filter harmful microbes from water in a convenient device. The filtration media may be directly adhered to the filter portion of the device using techniques such as overmolding or gluing. Alternatively, it may be designed to be removable.

The bottom and/or sides of the inner cup may also be fitted with sharp edges or other features that will aid in tearing, compressing or otherwise aggressive treatment of herbs or other beverage solids to aid in the release of their flavorings. In one embodiment, this would be ideal for creating cocktails where herbs or fruits can be crushed in the bottom of the outer cup, allowing their oils or juices to be more fully extracted and then filtered into the finished beverage.

Another embodiment includes the use of a rim stopper fitted to the top of the inner cup and just below its rim. The purpose of the rim stopper is to create a tactile stopping point for how far the inner cup is to be inserted into the outer cup. Different beverages may require different levels of insertion, and a corresponding ring would give a physical and visual indication of that stopping point. As an example, tea may require more expansion than coffee and so a different rim stopper height may be desired to ensure optimum extraction. In one embodiment, this would be an elastomeric ring.

Another embodiment includes a "self-cleaning" feature. The bottom cup is comprised of two pieces. In one embodiment, a lower portion of the outer cup is threaded onto the upper portion of the outer cup. When the filtration is complete and the beverage is consumed or otherwise dispensed, the lower portion is unscrewed from the upper portion. The lower portion contains the majority of the grinds or other flavor solids contained in the outer cup. By removing the lower portion of the outer cup, the grinds or flavor solids may be easily discarded into the trash or compost. The inner cup can then be further pressed into the outer cup to fully evacuate all solids remaining in the outer cup.

This system effectively cleans the outer cup of all waste and can be simply rinsed. The lower portion of the outer container can also be easily rinsed and reassembled to the upper portion of the outer cup for the next use.

In another embodiment, the infusing system is a carafe-style device. Once the beverage is infused, the device can be used to dispense the beverage rather than being used as a travel mug. This allows for a larger quantity of beverage to be infused and served. In another embodiment of the beverage infuser device, the infusing system is separated from the serving device. In this embodiment, the grounds are put into a vessel that is suspended over the cup. After a certain brewing period, the plunger is inserted into the vessel, and the coffee is pressed from the vessel into the cup below via a lever or handle. After brewing, the vessel can be removed from the vessel stand and cleaned. This is most easily done by unscrewing the filter portion and pressing the plunger all the way through the rest of the vessel, expelling the grounds into the garbage.

It will thus be seen that the objects set forth above, among those made apparent in the preceding description, are efficiently obtained, and, since certain changes may be made in the above construction without departing from the spirit and scope of the invention, it is intended that all matter contained in the above description or shown in the accompanying drawings shall be interpreted as illustrative, and not in a limiting sense.

It is also understood that the following claims are intended to cover all of the generic and specific features of the invention herein described and all statements of the scope of the invention, which, as a matter of language, might be said to fall therebetween.

What is claimed is:

1. A beverage filtering system for preparing a beverage by steeping solid material in a liquid to extract flavoring therefrom and to filter said solid material from said liquid for drinking, said system comprising:
   an outer cup for steeping solid material in a liquid;
   an inner cup, said inner cup being nestable within said outer cup and movable therewithin from an unfiltered position to a filtered position, said inner cup having an upper portion and a lower portion, wherein said inner cup has a bottom edge, and;
   a filter releasably coupled within said lower portion; and
   wherein said outer cup and said inner cup together form a beverage cup when said inner cup is in said filtered position for consumption of said beverage, and
   a sealing member including a first seal, wherein said sealing member is sized and configured to substantially cover the entirety of the exterior of said lower portion, said sealing member being releasably disposed around said lower portion of said inner cup, said first seal providing a seal between said inner cup and said outer cup when said inner cup is moved between said unfiltered position and said filtered position so that any liquid in the outer cup moving into the inner cup must pass through the filter,
   whereby, when said beverage has been prepared within said outer cup, said inner cup may be moved to the filtered position relative to said outer cup from said unfiltered position to filter solid material from said liquid for serving said beverage.

2. The beverage filtering system as claimed in claim 1, wherein said filter includes an upper surface, and wherein said upper surface has a plurality of perforations.

3. The beverage filtering system as claimed in claim 2, wherein said perforations are of a diameter to enable desired flavoring oils to pass through said upper surface without permitting particles of flavoring solids to pass therethrough.

4. The beverage filtering system as claimed in claim 2, wherein said perforations have a diameter in the range from 0.2 mm to 0.6 mm.

5. The beverage filtering system as claimed in claim 2, wherein said perforations have a diameter of approximately 0.4 mm.

6. The beverage filtering system as claimed in claim 1, further comprising a second sealing member, said second sealing member being disposed around the upper portion of said inner cup, said second sealing member limiting the movement of said inner cup into said outer cup to said filtered position.

7. The beverage filtering system as claimed in claim 1, wherein said lower portion of said inner cup has a bottom, and wherein said bottom includes a plurality of downwardly projecting studs, said downwardly projecting studs being provided to tear, compress, and otherwise compressively treat said solid material in said outer cup.

8. The beverage filtering system as claimed in claim 1, wherein said inner cup includes a removable bottom portion, said removable bottom portion facilitating the cleaning of said beverage filtering system.

9. The beverage filtering system as claimed in claim 1, further comprising a lid removably securable to the upper portion of said inner cup.

10. The beverage filtering system as claimed in claim 9, wherein said lid includes a sipping hole and a vent hole.

11. The beverage filtering system as claimed in claim 1, further comprising a lid removably securable to said inner cup for providing downward pressure on said inner cup for movement from said unfiltered position to said filtered position.

12. A beverage filtering system for preparing a beverage by filtering solid material in a liquid to filter said solid material from said liquid for drinking, said system comprising:
 an outer cup for containing solid material in a liquid; and
 an inner cup, said inner cup being nestable within said outer cup and movable therewithin from an unfiltered position to a filtered position, said inner cup having an upper portion and a lower portion and including a filter within the lower portion, wherein said upper portion has a first diameter and said lower portion has a second diameter, said second diameter being less than said first diameter; and
 a sealing member, said sealing member being removably disposed entirely around an external surface said lower portion of said inner cup, closer to the upper portion of the inner cup than the filter, said sealing member providing a seal between said inner cup and said outer cup when said inner cup is moved between said unfiltered position and said filtered position so that any liquid in the outer cup moving into the inner cup must pass through the filter;
 wherein said outer cup and said inner cup together
 wherein said outer cup and said inner cup together form a beverage server when said inner cup is in said filtered position for consumption of said beverage,
 whereby said inner cup may be moved to the filtered position relative to said outer cup from said unfiltered position to filter solid material from said liquid for serving said beverage.

13. The beverage filtering system as claimed in claim 12, wherein said lower portion of said inner cup includes a plurality of perforations, thereby providing said filter.

14. The beverage filtering system as claimed in claim 13, wherein said perforations are of a diameter to enable desired flavoring oils to pass through said filter without permitting particles of flavoring solids to pass therethrough.

15. The beverage filtering system as claimed in claim 13, wherein said perforations have a diameter in the range from 0.2 mm to 0.6 mm.

16. The beverage filtering system as claimed in claim 13, wherein said perforations have a diameter of approximately 0.4 mm.

17. The beverage filtering system as claimed in claim 12, further comprising a second sealing member, said second sealing member being disposed around the upper portion of said inner cup, said second sealing member limiting the movement of said inner cup into said outer cup to said filtered position.

18. The beverage filtering system as claimed in claim 12, wherein said lower portion of said inner cup has a bottom, and wherein said bottom includes a plurality of perforations, thereby providing said filter.

19. The beverage filtering system as claimed in claim 12, wherein said lower portion of said inner cup has a bottom and side walls, and wherein said sidewalls, proximate to said bottom, include a plurality of perforations, thereby providing said filter.

20. The beverage filtering system as claimed in claim 12, wherein said lower portion of said inner cup has a bottom, and wherein said bottom includes a plurality of downwardly projecting studs, said downwardly projecting studs being provided to tear, compress, and otherwise compressively treat said solid material in said outer cup.

21. The beverage filtering system as claimed in claim 12, wherein said inner cup includes a removable bottom portion, said removable bottom portion facilitating the cleaning of said beverage filtering system.

22. The beverage filtering system as claimed in claim 12, further comprising a lid removably securable to the upper portion of said inner cup.

* * * * *